(12) United States Patent
Stempora

(10) Patent No.: US 9,053,516 B2
(45) Date of Patent: Jun. 9, 2015

(54) RISK ASSESSMENT USING PORTABLE DEVICES

(71) Applicant: Jeffrey Stempora, Erie, PA (US)

(72) Inventor: Jeffrey Stempora, Erie, PA (US)

( * ) Notice: Subject to any disclaimer, the term of this patent is extended or adjusted under 35 U.S.C. 154(b) by 0 days.

(21) Appl. No.: 14/224,248

(22) Filed: Mar. 25, 2014

(65) Prior Publication Data

US 2015/0019266 A1    Jan. 15, 2015

Related U.S. Application Data

(60) Provisional application No. 61/846,521, filed on Jul. 15, 2013.

(51) Int. Cl.
*G06Q 40/00* (2012.01)
*G06Q 40/08* (2012.01)

(52) U.S. Cl.
CPC ...................................... *G06Q 40/08* (2013.01)

(58) Field of Classification Search
CPC ....... G06Q 10/00; G06Q 20/00; G06Q 30/00; G06Q 40/00
USPC ......................................................... 705/3–44
See application file for complete search history.

(56) References Cited

U.S. PATENT DOCUMENTS

| | | | |
|---|---|---|---|
| 5,445,347 A | 8/1995 | Ng | |
| 5,499,182 A | 3/1996 | Ousborne | |
| 5,797,134 A | 8/1998 | McMillan et al. | |
| 5,815,071 A | 9/1998 | Doyle | |
| 5,844,473 A | 12/1998 | Kaman | |
| 5,928,291 A | 7/1999 | Jenkins et al. | |
| 6,064,970 A | 5/2000 | McMillan et al. | |
| 6,236,933 B1 | 5/2001 | Lang | |
| 6,295,492 B1 | 9/2001 | Lang et al. | |
| 6,505,106 B1 | 1/2003 | Lawrence et al. | |

(Continued)

FOREIGN PATENT DOCUMENTS

| | | |
|---|---|---|
| EP | 0700009 A2 | 3/1996 |
| WO | 0017800 A1 | 3/2000 |

(Continued)

OTHER PUBLICATIONS

Kun Li , Man Lu , Fenglong Lu , Qin Lv , Li Shang , Dragan Maksimovic, "Personalized driving behavior monitoring and analysis for emerging hybrid vehicles," Proceedings of the 10th international conference on Pervasive Computing, Jun. 18, 2012, Newcastle, UK.

(Continued)

*Primary Examiner* — Frantzy Poinvil
(74) *Attorney, Agent, or Firm* — Zane Coleman

(57) ABSTRACT

In one embodiment, a method of evaluating vehicle operation performance comprises obtaining first information correlating to the movement of a vehicle; obtaining second information different from the first information correlating to the movement of a portable device relative to the vehicle; and correlating the first information with the second information to evaluate the vehicle operation performance by an operator of the portable device during use of the portable device while operating the vehicle. In another embodiment, the information correlating to the movement of the vehicle is correlating to the use of one or more software applications or the use of one or more functional features of a portable device by an operator of the portable device while operating the vehicle.

24 Claims, 5 Drawing Sheets

(56) References Cited

U.S. PATENT DOCUMENTS

| | | |
|---|---|---|
| 6,529,723 B1 | 3/2003 | Bentley |
| 6,594,579 B1 | 7/2003 | Lowrey et al. |
| 6,636,790 B1 | 10/2003 | Lightner et al. |
| 6,732,031 B1 | 5/2004 | Lightner et al. |
| 6,868,386 B1 | 3/2005 | Henderson et al. |
| 6,879,962 B1 | 4/2005 | Smith et al. |
| 7,355,510 B2 | 4/2008 | Rockett et al. |
| 7,356,392 B2 | 4/2008 | Hubbard et al. |
| 7,646,312 B2 | 1/2010 | Rosen |
| 7,715,961 B1 | 5/2010 | Kargupta |
| 7,818,588 B2 | 10/2010 | Duri et al. |
| 7,865,378 B2 | 1/2011 | Gay |
| 7,937,278 B1 | 5/2011 | Cripe |
| 8,027,853 B1 | 9/2011 | Kazenas |
| 8,090,598 B2 | 1/2012 | Bauer et al. |
| 8,117,049 B2 | 2/2012 | Berkobin et al. |
| 8,140,358 B1 | 3/2012 | Ling et al. |
| 8,180,655 B1 | 5/2012 | Hopkins, III |
| 8,407,139 B1 | 3/2013 | Palmer |
| 8,423,239 B2 * | 4/2013 | Blumer et al. ............... 701/33.7 |
| 8,457,880 B1 * | 6/2013 | Malalur et al. ............... 701/410 |
| 8,604,920 B2 | 12/2013 | Armitage et al. |
| 8,731,974 B2 * | 5/2014 | Pandhi et al. .................. 705/4 |
| 8,738,523 B1 * | 5/2014 | Sanchez et al. ................ 705/39 |
| 8,799,035 B2 * | 8/2014 | Coleman et al. ............... 705/4 |
| 2002/0111725 A1 | 8/2002 | Burge |
| 2002/0128882 A1 | 9/2002 | Nakagawa et al. |
| 2003/0187704 A1 | 10/2003 | Hashiguchi et al. |
| 2004/0024620 A1 | 2/2004 | Robertson et al. |
| 2004/0088090 A1 | 5/2004 | Wee |
| 2004/0153362 A1 | 8/2004 | Bauer et al. |
| 2005/0055248 A1 | 3/2005 | Helitzer et al. |
| 2005/0071202 A1 | 3/2005 | Kendrick |
| 2006/0031102 A1 | 2/2006 | Teller et al. |
| 2006/0053038 A1 | 3/2006 | Warren et al. |
| 2006/0095175 A1 * | 5/2006 | deWaal et al. ................. 701/33 |
| 2006/0212195 A1 | 9/2006 | Veith et al. |
| 2006/0253307 A1 | 11/2006 | Warren et al. |
| 2007/0027726 A1 | 2/2007 | Warren et al. |
| 2007/0120948 A1 | 5/2007 | Fujioka et al. |
| 2007/0257804 A1 | 11/2007 | Gunderson et al. |
| 2007/0268158 A1 | 11/2007 | Gunderson et al. |
| 2007/0299700 A1 | 12/2007 | Gay et al. |
| 2008/0064446 A1 | 3/2008 | Camp et al. |
| 2008/0065427 A1 | 3/2008 | Helitzer et al. |
| 2008/0077451 A1 | 3/2008 | Anthony et al. |
| 2008/0243558 A1 | 10/2008 | Gupte |
| 2008/0255888 A1 | 10/2008 | Berkobin et al. |
| 2008/0319602 A1 | 12/2008 | McClellan et al. |
| 2008/0319665 A1 | 12/2008 | Berkobin et al. |
| 2009/0024273 A1 | 1/2009 | Follmer et al. |
| 2009/0024419 A1 | 1/2009 | McClellan et al. |
| 2009/0079555 A1 | 3/2009 | Aguirre de Carcer et al. |
| 2009/0109037 A1 | 4/2009 | Farmer |
| 2009/0253423 A1 | 10/2009 | Kullberg |
| 2009/0275281 A1 | 11/2009 | Rosen |
| 2010/0017870 A1 | 1/2010 | Kargupta |
| 2010/0030582 A1 | 2/2010 | Rippel et al. |
| 2010/0030586 A1 | 2/2010 | Taylor et al. |
| 2010/0063850 A1 | 3/2010 | Daniel |
| 2010/0130182 A1 | 5/2010 | Rosen |
| 2010/0131304 A1 | 5/2010 | Collopy |
| 2010/0174566 A1 | 7/2010 | Helitzer |
| 2010/0205012 A1 | 8/2010 | McClellan |
| 2010/0238009 A1 | 9/2010 | Cook et al. |
| 2010/0250021 A1 | 9/2010 | Cook et al. |
| 2011/0009107 A1 | 1/2011 | Guba et al. |
| 2011/0012720 A1 | 1/2011 | Hirschfeld |
| 2011/0022420 A1 | 1/2011 | Morse et al. |
| 2011/0054767 A1 | 3/2011 | Schafer et al. |
| 2011/0153367 A1 | 6/2011 | Amigo et al. |
| 2011/0196571 A1 | 8/2011 | Foladare et al. |
| 2011/0202305 A1 | 8/2011 | Willis et al. |
| 2011/0213628 A1 | 9/2011 | Peak et al. |
| 2011/0215900 A1 | 9/2011 | Corradino et al. |
| 2011/0228753 A1 | 9/2011 | Polito et al. |
| 2011/0264246 A1 | 10/2011 | Pantoja et al. |
| 2011/0270636 A1 | 11/2011 | Raines et al. |
| 2011/0294520 A1 | 12/2011 | Zhou et al. |
| 2012/0004933 A1 | 1/2012 | Foladare et al. |
| 2012/0010906 A1 | 1/2012 | Foladare et al. |
| 2012/0015625 A1 | 1/2012 | Mendenhall et al. |
| 2012/0028680 A1 | 2/2012 | Breed |
| 2012/0029945 A1 | 2/2012 | Altieri et al. |
| 2012/0066007 A1 | 3/2012 | Ferrick et al. |
| 2012/0088462 A1 | 4/2012 | Mader et al. |
| 2012/0109692 A1 | 5/2012 | Collins et al. |
| 2012/0123806 A1 | 5/2012 | Schumann et al. |
| 2012/0176492 A1 | 7/2012 | Garin |
| 2012/0197669 A1 | 8/2012 | Kote et al. |
| 2012/0209632 A1 | 8/2012 | Kaminski et al. |
| 2012/0209634 A1 | 8/2012 | Ling et al. |
| 2012/0235819 A1 | 9/2012 | Watkins et al. |
| 2012/0246733 A1 | 9/2012 | Schäfer et al. |
| 2012/0303392 A1 * | 11/2012 | Depura et al. .................. 705/4 |
| 2013/0006675 A1 | 1/2013 | Bowne et al. |
| 2013/0013348 A1 | 1/2013 | Ling et al. |
| 2013/0018677 A1 | 1/2013 | Chevrette |
| 2013/0035117 A1 | 2/2013 | Litkouhi et al. |
| 2013/0046559 A1 | 2/2013 | Coleman et al. |
| 2013/0046562 A1 | 2/2013 | Taylor et al. |
| 2013/0060583 A1 | 3/2013 | Collins et al. |
| 2013/0060584 A1 | 3/2013 | Balthazar |
| 2013/0103429 A1 | 4/2013 | Buitrago |
| 2013/0151288 A1 | 6/2013 | Bowne et al. |
| 2013/0166326 A1 | 6/2013 | Lavie et al. |
| 2013/0297097 A1 | 11/2013 | Fischer et al. |
| 2013/0302758 A1 * | 11/2013 | Wright ........................... 434/65 |
| 2013/0316310 A1 | 11/2013 | Musicant et al. |
| 2013/0316311 A1 | 11/2013 | England |
| 2014/0019170 A1 * | 1/2014 | Coleman et al. ................. 705/4 |
| 2014/0046701 A1 * | 2/2014 | Steinberg et al. ............... 705/4 |
| 2014/0058761 A1 * | 2/2014 | Freiberger et al. ............. 705/4 |
| 2014/0089101 A1 | 3/2014 | Meller |
| 2014/0113619 A1 * | 4/2014 | Tibbitts et al. ................ 455/419 |
| 2014/0180727 A1 * | 6/2014 | Freiberger et al. ............. 705/4 |

FOREIGN PATENT DOCUMENTS

| | | |
|---|---|---|
| WO | 03065261 A1 | 8/2003 |
| WO | 2005083605 A1 | 9/2005 |
| WO | 2005109273 A1 | 11/2005 |
| WO | 2007032974 A1 | 3/2007 |
| WO | 2007076224 A2 | 7/2007 |
| WO | 2007104982 A2 | 9/2007 |
| WO | 2007133991 A2 | 11/2007 |
| WO | 2008079325 A1 | 7/2008 |
| WO | 2009011848 A1 | 1/2009 |
| WO | 2010062899 A1 | 6/2010 |
| WO | 2010085766 A2 | 7/2010 |
| WO | 2010144287 A2 | 12/2010 |
| WO | 2011057217 A2 | 5/2011 |
| WO | 2011079324 A2 | 6/2011 |
| WO | 2012097441 A1 | 7/2012 |
| WO | 2012103306 A2 | 8/2012 |
| WO | 2012158298 A2 | 11/2012 |
| WO | 2013040493 A1 | 3/2013 |
| WO | 2013096908 A1 | 6/2013 |

OTHER PUBLICATIONS

Johannes Paefgen, Flavius Kehr, Yudan Zhai, and Florian Michahelles. 2012. Driving behavior analysis with smartphones: insights from a controlled field study. In Proceedings of the 11th International Conference on Mobile and Ubiquitous Multimedia (MUM '12). ACM, New York, NY, USA, , Article 36 , 8 pages. DOI=10.1145/2406367.2406412.

Patrik Vogt, Jochen Kuhn, "Analyzing free fall with a smartphone acceleration sensor," The Physics Teacher, vol. 50, Mar. 2012, DOI: 10.1119/1.3685123.

Yan Wang, Jie Yang, Hongbo Liu, Yingying Chen, Marco Gruteser, and Richard P. Martin. 2013. Sensing vehicle dynamics for determining driver phone use. In Proceeding of the 11th annual international

(56) References Cited

OTHER PUBLICATIONS conference on Mobile systems, applications, and services (MobiSys '13). ACM, New York, NY, USA, 41-54. DOI=10.1145/2462456.2464447.

Mark Pedley, "Tilt sensing using a three-axis accelerometer," Application Note, Freescale Semiconductor Inc., Document No. AN3461, Rev. 6, Mar. 2013.

Almazan, J.; Bergasa, L.M.; Yebes, J.J.; Barea, R.; Arroyo, R., "Full auto-calibration of a smartphone on board a vehicle using IMU and GPS embedded sensors," Intelligent Vehicles Symposium (IV), 2013 IEEE, vol., no., pp. 1374,1380, Jun. 23-26, 2013, doi: 10.1109/IVS.2013.6629658.

Nisarg Kothari. (Aug. 19, 2011). An Extended Kalman Filter for Cell Phone Orientation Tracking [Online]. Available: http://www.andrew.cmu.edu/user/ndk/KDC_Report.pdf.

Fatemah Abyarjoo, Armando Barreto, Jonathan Cofino, Francisco Ortega, "Implementing a Sensor Fusion Algorithm for 3D Orientation Detection with Inertial/Magenetic Sensors," International Joint Conferences on Computer, Information, Systems Sciences, & Engineering (CISSE) Dec. 2012.

Shahid Ayub, Alireza Bahraminisaab, BahramHonary "A Sensor Fusion Method for Smart phone Orientation Estimation" The 13th Annual Post Graduate Symposium on the Convergence of Telecommunications, Networking, and Broadcasting (PGNet 2012), Jun. 2012, ISBN: 978-1-902560-26-7 © 2012 PGNet.

Talat Ozyagcilar, "Implementing a Tilt-Compensated eCompass using Accelerometer and Magnetometer Sensors," Application Note, Freescale Semiconductor Inc., Document No. AN4248, Rev. 3, Jan. 2012.

International Search Report for International Application No. PCT/IB2014/064404 dated Jan. 26, 2015.

Written Opinion of the International Searching Authority for International Application No. PCT/IB2014/064404 dated Jan. 26, 2015.

* cited by examiner

RISK ASSESSMENT USING PORTABLE DEVICES

TECHNICAL FIELD

The subject matter disclosed herein generally relates to monitoring and analyzing vehicle operation performance while using a portable device and using the same device or the same device and others to collect information for evaluating, quantifying or scoring the associated risk. Information can be obtained from the portable device, such as movement information of the portable device and optionally movement information of the vehicle or other sources. This information can be used to perform risk assessments and provide information to third parties such as an insurance company for insurance underwriting and loss control purposes.

BACKGROUND

Typically, systems that provide vehicular movement information for insurance underwriting or loss control utilize devices that must be physically connected to the operator's vehicle. These systems cannot fully analyze the behavior of the operator within the vehicle nor can they identify the vehicle operator. There is a need for a system and method for evaluating vehicle operation performance using a portable device, to identify the vehicle operator, and to evaluate and quantify the risk associated with operating the portable device and engaging in other distracting activities while operating the vehicle. Additionally, there is a need to monitor the relative movement of the operator of the vehicle and the movement of the vehicle. There is also a need to monitor the performance of the vehicle operator, provide alerts, monitor and modify the functionality of the portable device, and monitor and modify software application use during operator use while operating a vehicle.

SUMMARY

In one embodiment, a method of evaluating vehicle operation performance comprises obtaining first information correlating to the movement of a vehicle; obtaining second information different from the first information correlating to the movement of a portable device relative to the vehicle; and correlating the first information with the second information to evaluate the vehicle operation performance by an operator of the portable device during movement or use of the portable device while operating the vehicle. In another embodiment, the information correlating to the movement of the vehicle is correlated with the use of one or more software applications or the use of one or more functional features of a portable device by an operator of the portable device while operating the vehicle.

In another embodiment, a system for evaluating vehicle operation performance comprises a portable device comprising at least one accelerometer and a non-transitory computer-readable storage medium comprising accelerometer information received from the at least one accelerometer; a first processor executing an algorithm on the accelerometer information, the first processor extracting first information correlating to the movement of a vehicle and second information correlating to the movement of the portable device relative to the vehicle; and a second processor correlating the first information with the second information and evaluating the vehicle operation performance by an operator of the portable device during use of the portable device.

In another embodiment, a system for analyzing vehicle operation performance comprises: a portable device comprising a plurality of sensors operatively configured to provide movement information related to the movement of the portable device; a first processor executing a first algorithm on the movement information received from the plurality of sensors and extracting first information correlated to the movement of the portable device relative to the vehicle and second information correlated to the movement of the vehicle; and a second processor executing a second algorithm analyzing the first information and second information to evaluate vehicle operation performance by the operator of the portable device.

In another embodiment, a system for evaluating vehicle operation performance comprises: a portable device comprising at least one accelerometer and a non-transitory computer-readable storage medium comprising accelerometer information received from the at least one accelerometer; a first processor executing an algorithm on the accelerometer information, the algorithm extracting first information correlating to the movement of a vehicle and second information correlating to the movement of the portable device relative to the vehicle; and a second processor correlating the first information with the second information and evaluating the vehicle operation performance by an operator of the portable device during use of the portable device.

In another embodiment, a system analyzing vehicle operation performance comprises: a portable device comprising a plurality of sensors operatively configured to provide movement information related to the movement of the portable device; a first processor executing a first algorithm on the movement information received from the plurality of sensors and deriving first information related to the movement of the vehicle; and a second processor executing a second algorithm monitoring the use of one or more software applications or one or more functional features of the portable device within the vehicle and storing second information related to the use of one or more software applications or one or more functional features of the portable device within the vehicle on a non-transitory computer-readable storage medium; and a third processor executing a third algorithm analyzing the first information and second information and evaluating vehicle operation performance by the operator of the portable device.

In another embodiment, a system for generating risk related information for providing a risk score, a predictive model, or an insurance rate to an operator of a vehicle comprises: a portable device comprising at least one accelerometer and a non-transitory computer-readable storage medium comprising accelerometer information received from the at least one accelerometer; a first processor executing an algorithm on the accelerometer information and extracting first information correlating to the movement of a vehicle and second information correlating to the movement of the portable device relative to the vehicle; and a second processor correlating the first information with the second information and evaluating the vehicle operation performance by an operator of the portable device during use of the portable device.

In one embodiment, a portable device comprises: at least one accelerometer; at least one gyroscope; a gravitational measurement device operatively configured to provide orientation information of the earth's gravitational pull relative to the at least one accelerometer, the at least one gyroscope, or the portable device; a non-transitory computer-readable storage medium; and a first processor, the first processor executing a first algorithm on information received from the at least one accelerometer, the at least one gyroscope, and the gravitational measurement device; storing on the non-transitory computer-readable storage medium first output information from the algorithm correlating to the movement of the portable device; and separately storing on the non-transitory computer-readable storage medium second output information correlating to the movement of the portable device within a moving vehicle.

In another embodiment, the vehicle operation performance information derived from the system, method, or device is used to provide information for insurance underwriting, fraud detection, loss control, insurance claim analysis, or accident fault determination; to provide alerts and feedback of increased risk, dangers, prohibited, allowed, legal, or illegal portable device functional features or software applications; to modify the ability of the operator to use of one or more software applications or to restrict use of one or more software applications or one or more functional features of the portable device during the operation of the vehicle based on legal restrictions, insurance policy restrictions, first party restrictions, or third party restrictions; or to modify the ability of the operator to use of one or more software applications or one or more functional features of the portable device during the operation of the vehicle based on current and/or historical operation performance of the vehicle by the operator during use of the portable device.

DETAILED DESCRIPTION

Figure 1:
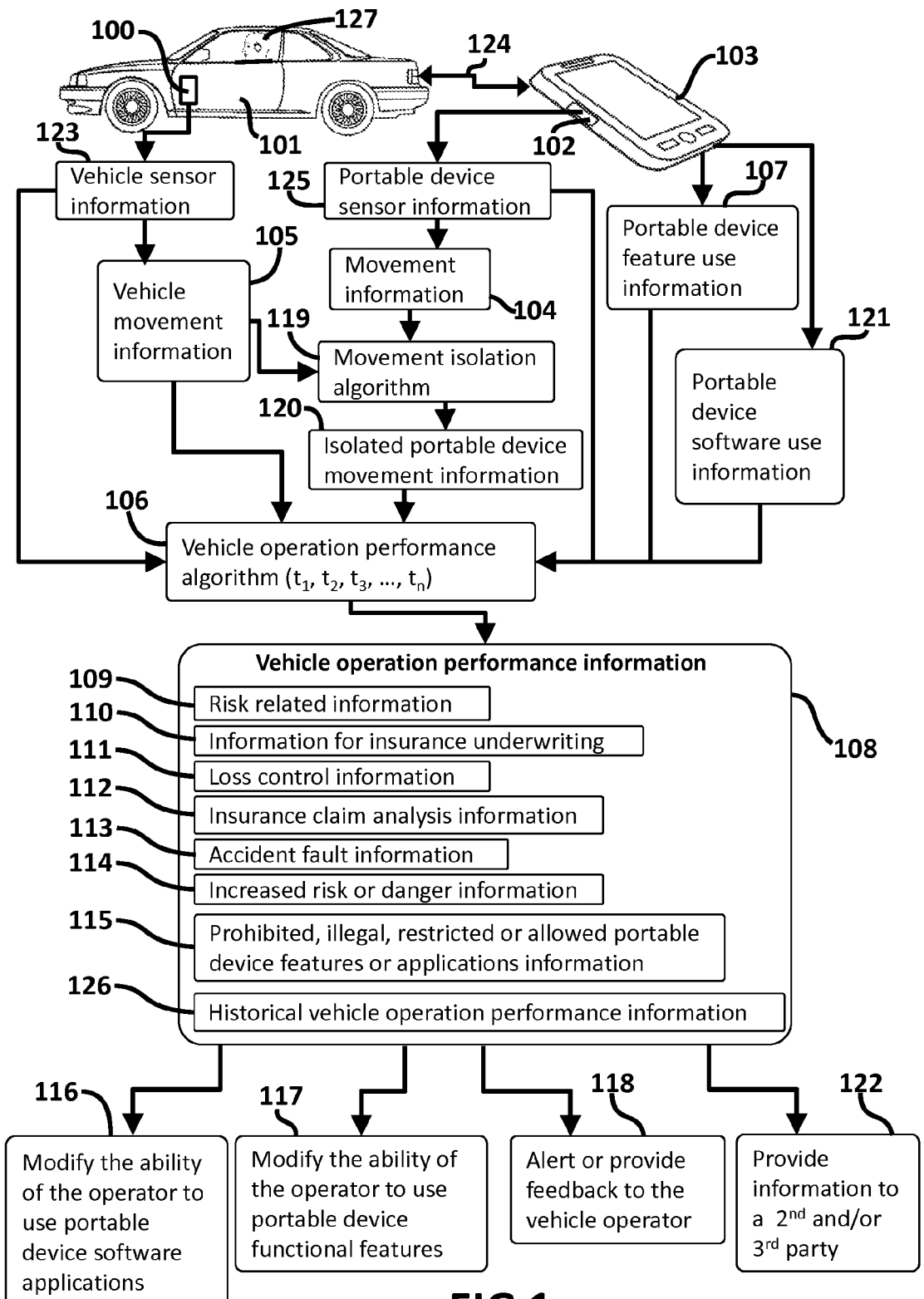
FIG. 1 is a data flow diagram of view of one embodiment of a vehicle operation performance analysis system for a vehicle operator operating a portable device while operating a vehicle.

The features and other details of the invention will now be more particularly described. It will be understood that particular embodiments described herein are shown by way of illustration and not as limitations of the invention. The principal features of this invention can be employed in various embodiments without departing from the scope of the invention. All parts and percentages are by weight unless otherwise specified.

Portable Device

In one embodiment, a system or method for analyzing vehicle operation performance comprises a portable device. In one embodiment, the portable device is a device readily transported by a single person and capable of providing computing operations. In one embodiment, the portable device is a cellular phone, smartphone, personal data assistant (PDA), personal navigation device (PND) such as a GPS system, tablet computer, watch (such as a smartwatch), a wearable computer, a personal display system, a personal portable computer, a laptop, head-mounted display, eyeglass display, eyewear display, pocket computer, pocket projector, miniature projector, wireless transmitter, microprojector, headphone device, earpiece device, mobile health device capable of storing, receiving, or transmitting health related information, handheld device, accessory of another portable device; or other computing device that can be transported or worn by a person.

In one embodiment, the portable device comprises one or more functional features. The one or more functional features include one or more selected from the group: display, spatial light modulator, indicator, projector, touch interface, touchscreen, keyboard, keypad, button, roller, sensors, radio transceiver or receiver, speaker, microphone, camera, user interface component, headphones, and wireless or wired communication feature (such as wireless headphone, Bluetooth™ headset, wireless user interface, or other device or vehicle wirelessly communicating with the portable device).

Portable Device or Vehicle Sensors

In one embodiment, the portable device and/or vehicle comprises one or more sensors selected from the group: antenna, a Global Positioning System (GPS) sensor (which may include an antenna tuned to the frequencies transmitted by the satellites, receiver-processors, and a clock), accelerometer (such as a 3D accelerometer), gyroscope (such as a 3D gyroscope), magnetometer, touch screen, button or sensor, temperature sensor, humidity sensor, proximity sensor, pressure sensor, blood pressure sensor, heart rate monitor, ECG monitor, body temperature, blood oxygen sensor, body fat percentage sensor, stress level sensor, respiration sensor, biometric sensor (such as a fingerprint sensor or iris sensor), facial recognition sensor, eye tracking sensor, security identification sensor, altimeter, magnetometer (including 3D magnetometer), digital compass, photodiode, vibration sensor, impact sensor, free-fall sensor, gravity sensor, motion sensor (including 9 axis motion sensor with 3 axis accelerometer, gyroscope, and compass), IMU or inertial measurement unit, tilt sensor, gesture recognition sensor, eye-tracking sensor, gaze tracking sensor, radiation sensor, electromagnetic radiation sensor, X-ray radiation sensor, light sensor (such as a visible light sensor, infra-red light sensor, ultraviolet light sensor, photopic light sensor, red light sensor, blue light sensor, and green light sensor), microwave radiation sensor, back illuminated sensor (also known as a backside illumination (BSI or BI) sensor), electric field sensor, inertia sensor, haptic sensor, capacitance sensor, resistance sensor, biosensor, barometer, barometric pressure sensor, radio transceiver, WiFi transceiver, Bluetooth™ transceiver, cellular phone communications sensor, GSM/TDMA/CDMA transceiver, near field communication (NFC) receiver or transceiver, camera, CCD sensor, CMOS sensor, microphone, voice recognition sensor, voice identification sensor, gas sensor, electrochemical gas sensor (such as one calibrated for carbon monoxide), gas sensor for oxidizing gases, gas sensor for reducing gases, breath sensor (such as one detecting the presence of alcohol), glucose sensor, environmental sensor, and pH sensor.

Accelomter Sensor

In one embodiment, the portable device and/or vehicle comprise one or more accelerometers. In one embodiment, the one or more accelerometers are selected from the group: micro electro-mechanical system (MEMS type accelerometer), single axis accelerometer, biaxial accelerometer, triaxial accelerometer, 6 axis accelerometer, multi-axis accelerometer, piezoelectric accelerometer, piezoresistive accelerometer, capacitive accelerometer, gravimeter (or gravitometer), bulk micromachined capacitive accelerometer, bulk micromachined piezoelectric resistive accelerometer, capacitive spring mass base accelerometer, DC response accelerometer, electromechanical servo (Servo Force Balance) accelerometer, high gravity accelerometer, high temperature accelerometer, laser accelerometer, low frequency accelerometer, magnetic induction accelerometer, modally tuned impact hammers accelerometer, null-balance accelerometer, optical accelerometer, pendulous integrating gyroscopic accelerometer (PIGA), resonance accelerometer, seat pad accelerometers, shear mode accelerometer, strain gauge, surface acoustic wave (SAW) accelerometer, surface micromachined capacitive accelerometer, thermal (sub-micrometer CMOS process) accelerometer, IMU (inertial measurement unit), and vacuum diode with flexible anode accelerometer. In one embodiment, the portable device and/or vehicle comprise two or more different types of accelerometers. Accelerometers are sensitive to the local gravitational field and linear acceleration and can be recalibrated for linear acceleration readings and orientation using data from one or more portable device sensors, one or more vehicle sensors, and/or other external data or input, for example.

Positioning System

In one embodiment, the portable device and/or vehicle comprises one or more sensors or components that can provide information for determining a global position or location (such as longitudinal and latitudinal coordinates), relative position or location (such as determining that the location of the portable device is near the driver's seat, the driver's left hand, or within a pocket or purse, for example), or local position or location (on a freeway, in a vehicle, on a train). In one embodiment, the portable device and/or vehicle comprise one or more Global Positioning System receivers that provide position information. In another embodiment, the portable device comprises one or more radio transceivers wherein triangulation or time signal delay techniques may be used to determine location information. Example radio transceivers that can be used to determine a position or location include radio transceivers operatively configured to transmit and/or receive radio signal in the form of one or more channel access schemes (such as Time Division Multiple Access (TDMA), Code division multiple access (CDMA), Frequency Division Multiple Access (FDMA), Global System for Mobile Communications (GSM), Long Term Evolution (LTE), packet mode multiple-access, Spread Spectrum Multiple Access (SSMA). In another embodiment, one or more radio transceivers, such as one operatively configured for Bluetooth™ or an IEEE 802.11 protocol (such as WiFi), is used to triangulate or otherwise provide information used to determine the global, local, or relative position or location information of the portable device. Other techniques which may be utilized to determine the location or position of the portable device or vehicle include computing its location by cell identification or signal strengths of the home and neighboring cells, using Bluetooth™ signal strength, barometric pressure sensing, video capture analysis, audio sensing, sensor pattern matching, video pattern matching, and thermal sensing.

Gyroscope

In one embodiment, the portable device and/or vehicle comprises one or more sensors providing orientation information and/or angular momentum information. In one embodiment, the portable device and/or vehicle comprises one or more gyroscopes selected from the group: MEMS gyroscope, gyrostat, fiber optic gyroscope, vibrating structure gyroscope, IMU (inertial measurement unit) and dynamically tuned gyroscope.

Compass

In one embodiment, the portable device and/or vehicle comprises an instrument that provides direction information in a frame of reference that is stationary relative to the surface of the earth. In one embodiment, the portable device and/or vehicle comprises a compass selected from the group: magnetic compass, digital compass, solid state compass, magnetometer based compass, magnetic field sensor based compass, gyrocompass, GPS based compass, Hall effect based compass, and Lorentz force based compass.

Communication Component

In one embodiment, the portable device communicates with the vehicle's internal sensors and systems, a remote server or processor, or a second portable device using a wired connection. In another embodiment, the connection between portable device and the vehicle, a remote server or processor, or a second portable device is one or more selected from the group of a serial connection, asynchronous serial connection, parallel connection, USB connection, radio wave connection (such as one employing an IEEE 802 standard, an IEEE 802.11 standard, Wi-Fi connection, Bluetooth™ connection, or ZigBee connection).

In one embodiment, the portable device communicates with the vehicle, a remote server or processor, or a second portable device using one or more communication architectures, network protocols, data link layers, network layers, network layer management protocols, transport layers, session layers, or application layers.

In one embodiment, the portable device employs at least one serial communication architecture selected from the group of RS-232, RS-422, RS-423, RS-485, I²C, SPI, ARINC 818 Avionics Digital Video Bus, Universal Serial Bus, FireWire, Ethernet, Fibre Channel, InfiniBand, MIDI, DMX512, SDI-12, Serial Attached SCSI, Serial ATA, HyperTransport, PCI Express, SONET, SDH, T-1, E-1 and variants (high speed telecommunication over copper pairs), and MIL-STD-1553A/B.

In another embodiment, the portable device and/or vehicle communicates with a second device using one or more protocols selected from the group of Ethernet, GFP ITU-T G.7041 Generic Framing Procedure, OTN ITU-T G.709 Optical Transport Network also called Optical Channel Wrapper or Digital Wrapper Technology, ARCnet Attached Resource Computer NETwork, ARP Address Resolution Protocol, RARP Reverse Address Resolution Protocol, CDP Cisco Discovery Protocol, DCAP Data Link Switching Client Access Protocol, Dynamic Trunking Protocol, Econet, FDDI Fiber Distributed Data Interface, Frame Relay, ITU-T G.hn Data Link Layer, HDLC High-Level Data Link Control, IEEE 802.11 WiFi, IEEE 802.16 WiMAX, LocalTalk, L2F Layer 2 Forwarding Protocol, L2TP Layer 2 Tunneling Protocol, LAPD Link Access Procedures on the D channel, LLDP Link Layer Discovery Protocol, LLDP-MED Link Layer Discovery Protocol—Media Endpoint Discovery, PPP Point-to-Point Protocol, PPTP Point-to-Point Tunneling Protocol, Q.710 Simplified Message Transfer Part, NDP Neighbor Discovery Protocol, RPR IEEE 802.17 Resilient Packet Ring, StarLAN, STP Spanning Tree Protocol, VTP VLAN Trunking Protocol, ATM Asynchronous Transfer Mode, Frame relay, MPLS Multi-protocol label switching, X.25, Layer 1+2+3 protocols, MTP Message Transfer Part, NSP Network Service Part, CLNP Connectionless Networking Protocol, EGP Exterior Gateway Protocol, EIGRP Enhanced Interior Gateway Routing Protocol, ICMP Internet Control Message Protocol, IGMP Internet Group Management Protocol, IGRP Interior Gateway Routing Protocol, IPv4 Internet Protocol version 4, IPv6 Internet Protocol version 6, IPSec Internet Protocol Security, IPX Internetwork Packet Exchange, SCCP Signalling Connection Control Part, Apple-Talk DDP, IS-IS Intermediate System-to-Intermediate System, OSPF Open Shortest Path First, BGP Border Gateway Protocol, RIP Routing Information Protocol, ICMP Router Discovery Protocol: Implementation of RFC 1256, Gateway Discovery Protocol (GDP), Layer 3.5 protocols, HIP Host Identity Protocol, Layer 3+4 protocol suites, AppleTalk, DECnet, IPX/SPX, Internet Protocol Suite, Xerox Network Systems, AH Authentication Header over IP or IPSec, ESP Encapsulating Security Payload over IP or IPSec, GRE Generic Routing Encapsulation for tunneling, IL Internet Link, SCTP Stream Control Transmission Protocol, Sinec H1 for telecontrol, SPX Sequenced Packet Exchange, TCP Transmission Control Protocol, UDP User Datagram Protocol, 9P Distributed file system protocol, NCP NetWare Core Protocol, NFS Network File System, SMB Server Message Block, SOCKS "SOCKetS", Controller Area Network (CAN), ADC, AFP, Apple Filing Protocol, BACnet, Building Automation and Control Network protocol, BitTorrent, BOOTP, Bootstrap Protocol, CAMEL, Diameter, DICOM, DICT, Dictionary protocol, DNS, Domain Name System, DHCP, Dynamic Host Configuration Protocol, ED2K, FTP, File Transfer Protocol, Finger, Gnutella, Gopher, HTTP, Hypertext Transfer Protocol, IMAP, Internet Message Access Protocol, Internet Relay Chat (IRC), ISUP, ISDN User Part, XMPP, LDAP Lightweight Directory Access Protocol, MIME, Multipurpose Internet Mail Extensions, MSNP, Microsoft Notification Protocol, MAP, Mobile Application Part, NetBIOS, File Sharing and Name Resolution protocol, NNTP, News Network Transfer Protocol, NTP, Network Time Protocol, NTCIP, National Transportation Communications for Intelligent Transportation System Protocol, POP3 Post Office Protocol Version 3, RADIUS, Rlogin, rsync, RTP, Real-time Transport Protocol, RTSP, Real-time Transport Streaming Protocol, SSH, Secure Shell, SISNAPI, Siebel Internet Session Network API, SIP, Session Initiation Protocol, SMTP, Simple Mail Transfer Protocol, SNMP, Simple Network Management Protocol, SOAP, Simple Object Access Protocol, STUN, Session Traversal Utilities for NAT, TUP, Telephone User Part, Telnet, TCAP, Transaction Capabilities Application Part, TFTP, Trivial File Transfer Protocol, WebDAV, Web Distributed Authoring and Versioning, DSM-CC Digital Storage Media Command and Control, and other protocols known by those in the art for digital communication between two devices.

In one embodiment, the portable device and/or vehicle comprises one or more communication components selected from the group: radio transceivers, radio receivers, near field communication components, radio-frequency identification RFID components, and optical communication components (such as laser diodes, light emitting diodes, and photodetectors).

In one embodiment, one or more communication components are used to provide location information, speed location, acceleration, average acceleration, or other movement information or location information for the portable device or a vehicle transporting the portable device.

Information Transfer Medium for Portable Device and Operator

In one embodiment, the portable device and/or vehicle comprises an information transfer medium that provides information to the operator of the vehicle, such as an alert or driving feedback. In one embodiment, the information transfer medium for transmitting information from the portable device to the operator (or from the vehicle to the operator or from the portable device to the operator via the vehicle) is one or more selected from the group: display (such as liquid crystal display, organic light emitting diode display, electrophoretic display, projector or projection display, head-up display, augmented reality display, head-mounted display, or other spatial light modulator), speaker, visible indicator (such as a pulsing light emitting diode or laser, or a light emitting region of the portable device or vehicle), and mechanical indicator (such as vibrating the portable device, a seat, or a steering wheel). In one embodiment, the portable device performs a risk assessment and provides an alert to the operator using one or more information transfer media.

Multi-Sensor Hardware Component

In one embodiment, the portable device and/or vehicle comprises a multi-sensor hardware component comprising two or more sensors. In one embodiment, the two or more sensors measure two or more fundamentally different properties, such as a multi-sensor hardware component comprising an accelerometer and gyroscope to measure acceleration and orientation simultaneously or sequentially. In another embodiment, the two or more sensors measure properties at different times, at different portable device locations or positions, at different portable device orientations, or along different axes or directions. For example, in one embodiment, the portable device and/or vehicle comprises a multi-sensor hardware component comprising: multiple gyroscopes; multiple accelerometers; one or more accelerometers and one or more gyroscopes; one or more gyroscopes and a digital compass; or one or more gyroscopes, one or more accelerometers, and a compass. In another embodiment, one or more sensors, processors, gyroscopes, digital compasses, or global positioning systems are combined into a single hardware component (such as an integrated component that can be placed on a rigid or flexible circuit board). In one embodiment, the speed of re-calibration of the portable device movement is increased by integrating the one or more sensors (and optionally a processor) into a single multi-sensor hardware component. In one embodiment a sensor is combined with a processor in a single hardware component. In one embodiment, a portable device comprises a multi-sensor hardware component comprising a digital compass, an accelerometer, and a gyroscope.

Software

In one embodiment, the portable device and/or vehicle comprises one or more processors operatively configured to execute one or more algorithms on input information. One or more algorithms disclosed herein may be executed on one or more processors of the portable device, the vehicle, or a remote device (such as a remote server). In one embodiment, the portable device comprises software or software components executing one or more algorithms. The software and/or data may be stored on one or more non-transitory computer-readable storage media. The software may be the operating system or any installed software or applications, or software, applications, or algorithms stored on a non-transitory computer-readable storage medium of the portable device and/or vehicle. One or more software components may comprise a plurality of algorithms, such as for example, a cognitive capacity algorithm, a cognitive load algorithm, a communication algorithm, a movement isolation algorithm, an algorithm that monitors the use of one or more software applications accessible using the portable device, an algorithm that monitors the use of one or more functional features of the portable device, an algorithm that processes data received from the vehicle, an algorithm that processes information received from a server, and an algorithm that processes information received from one or more sensors or input devices, an algorithm that analyzes or generates risk related information and/or risk scoring, an algorithm that determines risk associated with the use of one or more software applications accessible using the portable device while operating the vehicle, an algorithm that determines the risk associated with the use of one or more functional features of the portable device while operating the vehicle, an algorithm that determines levels of distracted driving, an algorithm providing an appropriate form of alert or form of information based on an increased risk or potential increased risk, an algorithm that evaluates vehicle operation performance, an algorithm that determines the location or position of the operator of the portable device, an algorithm that determines whether or not the operator of the portable device is operating the vehicle or in a position to operate the vehicle, an algorithm that determines mental or physical health condition of the operator of the portable device, an algorithm that determines the field of vision of the driver (using information derived from a camera, for example), a portable device function modification algorithm, a portable device software restriction algorithm, a legal analysis algorithm, a third party portable device restriction algorithm, and an insurance information providing algorithm.

On or more algorithms may be executed within the framework of a software application (such as a software application installed on a portable cellular phone device) that may provide information to an external server or communicate with an external server or processor that executes one or more algorithms or provides information for one or more algorithms to be executed by a processor on the portable device. One or more static or dynamic methods for providing or generating risk assessment, risk scoring, loss control, risk information, evaluating vehicle operation performance, monitoring vehicular operator behavior, monitoring portable device use behavior, providing insurance related information or adjusting the price of insurance, responding to increased operational risk for an operator of a vehicle, evaluating cognitive ability of a driver, evaluating level of distraction while driving, or other operations performed by other algorithms disclosed herein may be executed by one or more algorithms, software components, or software applications on one or more processors of the portable device and/or vehicle, a processor remote from the portable device and/or vehicle, or a processor in operative communication with the portable device and/or vehicle.

In one embodiment, the software is built into the portable device and/or vehicle; installed on the portable device and/or vehicle; second party software (such as software installed by the communication service provider for the portable device); third party software, software use monitoring software; portable device functional use monitoring software; an insurance software application; a safety application; a risk analysis application; a risk scoring application; an insurance rate calculation or indication application; a loss control assessment application; software indicating, providing an alert, or providing information related to an increased or potentially increased risk or danger for operating a vehicle; a third party restrictive software application (such as an insurance provider application restricting functions or applications while driving or a parental restriction application restricting use of applications or features); physical and/or mental health or condition monitoring software; or environmental monitoring software (such as software that analyzes weather, road conditions, traffic, etc.).

In another embodiment, the portable device and/or vehicle comprises a processor that executes one or more algorithms and/or a non-transitory computer-readable storage medium comprises one or more algorithms that analyzes data, separates data (such as an algorithm separating vehicle movement information from portable device movement information from movement information received from one or more sensors), receives data, transmits data, provides alerts, notifications or information, communicates to an insurance company or underwriter, communicates with an analysis service provider or other third party service or data provider, communicates with a data aggregator, communicates with a third party, performs risk assessments, or communicates with a second party (through an insurance carrier for example), or third party (third party risk assessor), or communicates with another vehicle or vehicle infrastructure network.

Third Party Software

In one embodiment, the portable device and/or vehicle comprises third party software such as communication software, entertainment software, analysis software, navigation software, camera software, information gathering software, internet browsing software, or other software that provides information to the operator of the portable device by executing one or more algorithms. Other software may be installed, configured to be used on a portable device, or accessible using the portable device, such as software known in the industry to be suitable for use on a smart phone, tablet, personal computer, in a vehicle, or on a portable or wearable electronic device. In one embodiment, second party or third party software use is monitored by a monitoring algorithm.

Monitoring Algorithm

In one embodiment, a portable device and/or vehicle comprises a processor or is in communication with a processor that executes a monitoring algorithm that performs one or more functions selected from: recording data from sensors, camera, microphone, or user interface components (touchscreen, keypad, buttons, etc.) of the portable device and/or vehicle, recording the use of portable device functions, recording the use of vehicle functions, and recording portable device and/or vehicle features, software, or application use.

Vehicle

A vehicle is a mobile device or machine that transports passengers and/or cargo. The vehicle may be, for example, an automobile, an aircraft, a watercraft, a land craft, a bicycle, a motorcycle, a truck, a bus, a train, a ship, a boat, a military vehicle, a commercial vehicle, a personal vehicle, a motorized vehicle, a non-motorized vehicle, an electric vehicle a combustion powered vehicle, a hybrid combustion-electric vehicle, a nuclear powered vehicle (such as a submarine), a skateboard, a scooter, or other human or cargo transportation device or machine known to be suitable to mechanically transport people or objects.

Vehicle Sensors

In one embodiment, the vehicle comprises one or more sensors that provide vehicle performance information, vehicle status information, operator or occupant information, situational information, or environmental information. In one embodiment, the vehicle comprises one or more sensors selected from the group: temperature sensors measuring the temperature of a location (such as the engine) or vehicle material (cooling fluid), ambient air pressure, pressure sensors, barometric pressure sensors, oxygen sensors, crankshaft position sensor, microphone, accelerometer, positioning system sensor, gyroscope, compass, magnetometer, communication sensor, turbocharger boost sensor, engine position sensor, engine speed timing sensor, synchronous reference sensor, oil pressure sensor, oil level sensor, coolant level sensor, starter lockout sensor, vehicle speed sensor, electronic foot pedal assembly, throttle position sensor, air-temperature sensor, fuel restriction sensor, fuel temperature sensor, fuel pressure sensor, crankcase pressure sensor, coolant pressure sensor, speedometer, garage parking sensor, knock sensor, video camera (visible light, infrared light, or visible and infrared light), light-detection-and-ranging LIDAR, radar, ultrasonic sensor, seat belt sensor, seat occupancy sensor, body mass sensor, occupant position sensors, airbag deployment sensor, collision sensor, face tracking sensor, gaze tracking sensor, water sensor, occupant sensor, mobile phone sensor, portable communication device sensor, blind spot sensor, lane departure sensor, ultrasonic low-speed collision avoidance sensor, photosensors (infrared, visible, and/or ultraviolet), voltage sensors, current sensors, rain sensors, fog sensors, road obstruction sensors, touch sensors, buttons, dials, levers, switches, and wireless distributed sensors.

In one embodiment, the vehicle comprises an on-board diagnostics (OBD) system. In one embodiment, the vehicle OBD system wired or wirelessly communicates information to the portable device and/or from the portable device. In another embodiment, the vehicle comprises a communication system that communicates diagnostic, environmental, operator, occupant, vehicle status, or situational information to the portable device, to a server, or to a second party or third party directly (or indirectly using another device) using a communication component of the portable device.

Vehicle Communication Component

In one embodiment, the vehicle comprises a radio transceiver and communicates directly with a wireless communication access provider such as a cellular telephone and data service provider. In one embodiment, the vehicle comprises a communication device selected from the group: radio transceiver, radio receiver, WiFi transceiver, Bluetooth™ transceiver, near field communication device (such as RFID), optical communication component, and wired communication component. In one embodiment, the vehicle communication component is used to determine location of the operator and/or one or more occupants within vehicle, provide a communication link to a portable device, provide a communication link to an external party, provide a communication link to a vehicle infrastructure network or exchange, or provide a communication link to a communication tower for cellular voice or data communication. In one embodiment, the portable device is paired with a Bluetooth™ device that connects to the OBD II port (or other diagnostic communication port) on the vehicle. In another embodiment, pairing of the portable device and the Bluetooth™ device is automated via near field communications technology that allows the vehicle operator to simply place the portable device near the Bluetooth™ device to pair it and identify the Vehicle Identification Number (VIN) of the vehicle. In another embodiment, the portable device scans a Quick Response code (QR code) or bar code within the vehicle that pairs the portable device with the vehicle Bluetooth™ and provides the vehicle VIN.

Information Transfer Medium for Vehicle and Operator

In one embodiment, the vehicle comprises an information transfer medium that provides information to the operator of the vehicle, such as an alert. In one embodiment, the information transfer medium for transmitting information from the vehicle to the operator is one or more selected from the group: display (such as liquid crystal display, organic light emitting diode display, electrophoretic display, head-up display, augmented reality display, head-mounted display, or other spatial light modulator), speaker, visible indicator (such as a pulsing light emitting diode or laser, or a light emitting region of the portable device or vehicle), and mechanical indicator (such as vibrating the portable device, a seat, or a steering wheel). In one embodiment, the portable device performs a risk assessment and provides an alert to the operator using one or more information transfer media.

External Intermediate Device

In one embodiment, the system comprises a device that physically and/or wirelessly connects to the vehicle and communicates with the vehicle and the portable device. In one embodiment, the external intermediate device plugs into a vehicle or vehicle information port such as an OBD II port or has connectivity to a vehicle infrastructure network or exchange.

Portable Device and Vehicle Movement

In one embodiment, the portable device records temporal and/or spatial movement information received from one or more portable device sensors on a non-transitory computer-readable storage medium. As used herein, "movement information" refers to information relating to the position, orientation, tilt, pitch, rotation, yaw, velocity, and/or acceleration of an object in one or more directions, such as a velocity of 60 miles per hour in a due North direction. As used herein "temporal movement information" refers to the time indexed movement information, such as temporal movement information of two meters per second in a direction due North at 1:13:25 pm Jan. 2, 2012, for example). In one embodiment, temporal and/or spatial movement related information (such as position, orientation, tilt, rotation, speed, and/or acceleration measured at specific times or intervals, for example) from one or more sensors on the portable device and/or one or more sensors on the vehicle is processed to isolate information correlating to temporal and/or spatial vehicle movement and information correlating to temporal and/or spatial movement of the portable device relative to the vehicle. In one embodiment, the isolated information correlating to temporal and/or spatial movement of the portable device is used to provide information related to temporal and/or spatial functional use or operation of the portable device (such as detecting whether the operator is viewing the screen or dropped the portable device in the vehicle at a specific time such as the time of an accident, for example). In another embodiment, the isolated information correlating to temporal and/or spatial vehicle movement is used to evaluate vehicle operation performance (such as determining the speed of the vehicle around a corner, for example). In one embodiment, the isolated information correlating to temporal and/or spatial vehicle movement and the isolated information correlating to temporal and/or spatial movement of the portable device relative to the vehicle is obtained using only sensor temporal and/or spatial movement information obtained from portable device sensors.

Movement Isolation Algorithm

In one embodiment, the portable device comprises a processor executing a movement isolation algorithm that isolates or separates the temporal and/or spatial vehicle movement information and the temporal and/or spatial movement information of the portable device relative to the vehicle from the temporal and/or spatial movement information received from the one or more portable device sensors (and optionally from temporal and/or spatial vehicle movement information from one or more vehicle sensors). In another embodiment, the isolation algorithm isolates or separates the temporal and/or spatial vehicle movement information and the temporal and/or spatial movement information of the portable device relative to the vehicle using an external reference framework, such as the earth for example. In this embodiment, the temporal and/or spatial vehicle movement information is acquired or calculated (by a movement isolation algorithm, for example) relative to a reference framework, such as determining the vehicle speed relative to the earth in a first direction using information from one or more portable device sensors (or sensors in a vehicle or from other external devices). The temporal and/or spatial movement information of the portable device relative to an external framework (such as the earth) can be acquired or calculated (by a movement isolation algorithm, for example) and the temporal and/or spatial movement information of the portable device relative to the vehicle can be determined using the movement isolation algorithm by analyzing the temporal and/or spatial movement information of the portable device and the vehicle relative to the external framework.

In one embodiment, the movement isolation algorithm compares temporal and/or spatial movement information from one or more portable device sensors with temporal and/or spatial movement information received from one or more vehicle sensors to isolate the temporal and/or spatial portable device movement. In another embodiment, the portable device communicates the temporal and/or spatial movement information received from the one or more portable device sensors (and optionally temporal and/or spatial vehicle movement information from one or more vehicle sensors) to a processor remote from the portable device that executes the movement isolation algorithm that isolates or separates the temporal and/or spatial vehicle movement information and the temporal and/or spatial movement information of the portable device relative to the vehicle.

In one embodiment, the movement isolation algorithm removes sensor noise and contextual noise from the movement information received from the one or more portable device sensors and/or vehicle sensors. In another embodiment, the portable device orientation and movement is recalibrated frequently. In another embodiment, the portable device or vehicle comprises one or more sensors, cameras, microphones, or human interface components that determine if the portable device operator is the operator of the vehicle. In one embodiment, the movement isolation algorithm receives temporal and/or spatial movement or position related information or other information input from one or more selected from the group: portable device sensors; vehicle sensors; vehicle GPS sensors; portable device GPS sensors; external or internal data sources (such as map data stored on the portable device or obtained from a remote server); diagnostic information, human interface information, and/or sensor information received from the vehicle; diagnostic information, human interface information, and/or sensor information received from one or more portable device sensors, portable device human interface components, portable device software applications or algorithms, or a portable device software or functional use monitoring algorithm; the vehicle; a portable device processor, a vehicle processor, radio transceivers or receivers providing position and/or movement information directly or indirectly using triangulation; radio transceivers or receivers providing position and/or movement information directly or indirectly using signal delay, radio transceivers or receivers providing position and/or movement information directly or indirectly using cellular tower location information; and vehicle radio transceivers or receivers providing position and/or movement information directly or indirectly using triangulation or signal delay from wireless communication with the portable device and the vehicle radio transceivers or receivers and vehicle infrastructure networks or exchanges.

For example, in one embodiment, the movement isolation algorithm receives input from the portable device touch screen human interface device that the screen was touched at a specific time and the brief downward movement of the portable device can be isolated as portable device movement and not vehicle movement (such as when a vehicle would hit a bump in the road). In another example, GPS position information from the portable device's or vehicle's GPS sensors is analyzed and correlated to or combined with other sensor readings to correct for position errors due to sensor drift.

In another embodiment, the movement isolation algorithm applies one or more adjustments selected from the group: dynamic orientation correction, motion correction, motion compensation, motion filtering, frequency filtering, temporal filtering, spatiotemporal filtering, spatial filtering, and noise removal to the temporal and/or spatial motion information using portable device hardware, a portable device processor executing an algorithm (such as a noise removal algorithm), and/or an external processor executing an algorithm; and the motion isolation algorithm may further take into account other temporal and/or spatial movement or position related information input.

Removing Sensor Noise

In one embodiment, the movement isolation algorithm removes sensor drift by frequently recalibrating the gyroscope and accelerometers to the direction of gravity and earth framework, compass north, and/or distance traveled (such as indicated by GPS sensors, for example). In another embodiment the movement isolation algorithm removes intrinsic high and low frequency noise due to mechanical noise, sensor noise, and thermally dependent electrical noise. In a further embodiment, the movement isolation algorithm removes contextual noise such as vehicle vibrations.

Recalibration of Portable Device Movement

In one embodiment the portable device gyroscope and/or the vehicle gyroscope is recalibrated using hardware recalibration, software recalibration, a combination of hardware and software recalibration, or hardware accelerated recalibration. In one embodiment, the movement information from one or more portable device sensors, isolated information correlating to temporal and/or spatial portable device movement using the movement isolation algorithm, or isolated information correlating to temporal and/or spatial vehicle movement using the movement isolation algorithm is compared to the vehicle movement information obtained from one or more vehicle sensors to improve accuracy, to provide additional information for isolation or noise filtering, verify the accuracy of the isolated information, to provide correlation information or data points, or to provide information for recalibration. The orientation of the device can be recalibrated by recalibrating the data (such as providing a correction factor to the data, for example) received from one or more sensors (such as a gyroscope) or by recalibrating the sensor such that it provides recalibrated data to the one or more device components, sensors, processors, or algorithms.

Frequency of Recalibration

In one embodiment, the portable device measures speed, position, orientation, and/or acceleration using one or more portable device sensors and if the results of the measurements are above, below, or equal to a threshold value, one or more portable device sensors (such as the gyroscope and/or the accelerometer) are recalibrated. In another embodiment, the portable device compares the current speed, position, orientation, and/or acceleration movement information using one or more portable device sensors with a previous measurement of the same movement information and the if the difference between the measured values is above, below, or equal to a threshold, the orientations of the portable device, gyroscope, and/or accelerometers are recalibrated. For example in one embodiment, when the orientation change measured using the portable device gyroscope is less than a 0.5 degree threshold from the previous measurement, the device orientation is recalibrated using a compass, gyroscope, and/or accelerometer of the device.

In one embodiment, the portable device gyroscope and/or the vehicle gyroscope is recalibrated when the portable device has a speed of zero and/or the vehicle has a speed of zero. In another embodiment, the portable device gyroscope and/or the vehicle gyroscope is recalibrated at a fixed or variable frequency when the portable device has a speed greater than zero and/or the vehicle has a speed greater than zero.

In one embodiment, the device orientation is recalibrated at a fixed or variable frequency. In one embodiment, the device orientation is calibrated at a fixed frequency (or at an average frequency during the instance of operating the vehicle and portable device simultaneously) greater than one selected from the group 0.5 Hz, 1 Hz, 2 Hz, 5 Hz, 10 Hz, 50 Hz, 100 Hz, 200 Hz, 500 Hz, 800 Hz, 1000 Hz, 1500 Hz, 2000 Hz, 5000 Hz, and 10,000 Hz.

In one embodiment, the frequency of the gyroscope recalibration is increased when portable device use is detected or based on an algorithm that calculates optimal recalibration based on prior activity history. In another embodiment, the gyroscope is recalibrated at a fixed frequency or at a portable device transition event, and the frequency is increased when a portable device operational movement event is detected. As used herein, a portable device operational movement event occurs when there is a measurement or estimation that the portable device is in motion or use. A portable device transition event occurs when the measurement or estimation of the speed of the portable device is estimated to be substantially zero (i.e. the vehicle and portable device are not moving) and the portable device is estimated or measured to not be in use. In one embodiment, the recalibration frequency is increased by a factor greater than one selected from the group: 2, 5, 10, 50, 100, 500, and 1000 when use of the portable device while operating the vehicle is detected.

In one embodiment, the portable device comprises a multi-component sensor and the time required to be moving in a constant direction is less than one selected from the group 5 seconds, 1 second, 0.5 seconds, 0.1 seconds, 0.05 seconds, 0.01 seconds, 0.005 seconds, and 0.001 seconds for a device orientation calibration accuracy greater than one selected from the group 1 degree, 0.5 degrees, 0.01 degrees along one or more axes.

Dynamic Vehicle Movement and Portable Device Movement Isolation and Recording

In one embodiment, the vehicle movement information and portable device movement information are isolated and recorded dynamically during operation of the vehicle and portable device. The portable device and vehicle often have movement information that occurs on different time scales (different time-frequency domains) such as turning a corner or placing a speaker on the portable device up to the operator's ear. In one embodiment, the movement isolation algorithm isolates movement information correlating to movement of the portable device relative to the vehicle and/or movement information correlating to movement of the vehicle by separating the at least a portion of the movement information from one or more portable device sensors in the time domain. In one embodiment, the movement isolation algorithm separates movement information correlating to movement of the portable device relative to the vehicle from movement information correlating to movement of the vehicle; isolates the movement information correlating to movement of the portable device relative to the vehicle; isolates movement information correlating to movement of the vehicle; or filters out movement information or noise not relevant to isolating the movement information correlating to movement of the vehicle and/or movement information correlating to movement of the portable device relative to the vehicle. In one embodiment, the movement isolation algorithm selectively isolates particular movement information relative to the portable device or vehicle. In one embodiment, the movement isolation algorithm separates relevant portable device movement information from non-relevant portable device movement information. For example, an operator of an automobile slowly moving a portable device by about 1 inch left and right while not viewing the portable device (such as determined by a vehicle or portable device camera) may be filtered out of the portable movement information since it is not indicative of portable device movement while viewing the device. In another embodiment, the movement isolation algorithm separates relevant vehicle device movement information from non-relevant vehicle device movement information. For example, movement information correlating to constant speed vehicle movement in a substantially constant direction, such as a vehicle operator driving on a long, open, straight highway, may be removed from the relevant movement information or condensed to shortened representation.

In one embodiment, the movement isolation algorithm utilizes wavelet based time-frequency analysis to isolate the information in the time-frequency domain. In another embodiment, the movement isolation algorithm uses one or more mathematical filters, analysis methods, or processing methods selected from the group: Bayesian networks, Kalman filters, hidden Markov models, wavelet frequency analysis, low pass filters, high pass filters, Gaussian high pass filters, Gaussian low pass filters, and Fourier Transforms. In one embodiment, the movement isolation algorithm utilizes a plurality of mathematical filters, analysis methods, or processing methods to determine the relevant movement information. In another embodiment, one or more algorithms executed by the portable device processor performs dynamic reorientation compensation and calibration of one or more sensors (such as a gyroscope) and/or the device such that portable device does not have to be stationary relative to the vehicle to accurately monitor driving performance. In a further embodiment, one or more algorithms executed by the portable device processor performs real-time dynamic reorientation compensation and calibration of one or more sensors (such as a gyroscope) and/or the portable device.

In one embodiment, the temporal and/or spatial movement information from one or more portable device sensors or one or more vehicle sensors or other temporal and/or spatial movement information (including position information such as map information) is analyzed to estimate the type of vehicle operation (such as riding a bicycle, bus, automobile, train, plane, etc.) or operator movement (such as walking).

In one embodiment, one or more algorithms within an application (or on embedded hardware/software) executed by a processor on the portable device allow it to differentiate between vehicle movement and human use of the portable device, or movement of the portable device relative to the vehicle.

Vehicle Operation Performance Analysis Related to Portable Device Movement, Portable Device Function Use, and Portable Device Application Use In one embodiment, a method of analyzing risk comprises correlating driving performance with the operation of a portable device; correlating driving performance with operation of a specific application, software or function on the portable device; or analyzing the individual cognitive effort required to operate the portable device while operating the vehicle. The vehicle operation performance may be analyzed using a vehicle operation performance algorithm. The vehicle operation performance algorithm input can include information originating from one or more vehicle sensors, vehicle human interface components, portable device sensors, portable device human interface components, or devices external to the vehicle (such as speeding cameras, traffic violation reports, external map information, another vehicle, vehicle infrastructure network or exchange, or weather information, for example). For example, the vehicle operation performance analysis performed by the vehicle operation performance algorithm may include input such as accident information, speeding data, swerving information, safe driving, unsafe driving, location, route choice, parking violations, average cognitive load during a trip, or traffic information. In one embodiment, the vehicle operation performance algorithm correlates the temporal movement information with other vehicle operation performance algorithm input information to evaluate the vehicle operator performance.

In one embodiment, the vehicle operation performance analysis, risk assessment analysis, and/or risk scoring is performed by a vehicle operation performance algorithm executed on a portable device processor or a remote processor in communication with the portable device. In one embodiment, the sensor input information for the vehicle operation performance algorithm comprises sensor input information obtained exclusively from portable device sensors or movement information obtained exclusively from portable device sensors. In another embodiment, the sensor input information for the vehicle operation performance algorithm comprises sensor input information from one or more portable device sensors and one or more vehicle sensors. For example, if a vehicle operator drops the portable device while simultaneously operating the portable device and a vehicle, subsequently reaches for the device and has an accident, a movement isolation algorithm executed on the portable device could isolate the temporal and/or spatial movement information correlating to the temporal and/or spatial movement of the portable device (the acceleration of the portable device in the direction of gravity's pull corresponding to the drop of the portable device) from the temporal and/or spatial movement information correlating to the temporal and/or spatial movement of the vehicle. The vehicle operation performance algorithm could then analyze this isolated temporal and/or spatial movement information for the portable device and correlate the time of the drop to a time just prior to the accident (where the time of the accident may be determined by the algorithm by identifying the time of a sudden deceleration due to a collision or spatial collision sensor information provide from the vehicle OBD system). By estimating the causal relationship, probable causal relationship, or estimating the risk due to the occurrence (or lack of occurrence) of a positive event (no crash, safe driving behavior, etc.) or negative event (collision, speeding violation, legal infraction, etc.), the vehicle operation performance algorithm can provide risk related information for the vehicle operator that could be used, for example, to provide real-time, dynamic, event-based, irregular, or regular vehicle operation risk assessment, risk scoring, and/or insurance pricing for the operator.

Software or Portable Device Function Monitoring

In one embodiment, the portable device comprises a processor that executes a monitoring algorithm that monitors and/or analyzes and detects the functional use of the portable device using portable device sensors (such as a motion sensors) or portable device user interface features (display, user interface accessory or wired or wirelessly connected user interface device, headset, touchscreen, keypad, buttons, etc.). In another embodiment, the portable device comprises a processor that executes a monitoring algorithm that records the use of one or more software components or algorithms accessible using the portable device. For example, in one embodiment, the monitoring algorithm analyzes the isolated information correlating to the temporal and/or spatial movement of the portable device from the movement isolation algorithm and proximity sensor and determines that the portable device has moved to a location near the ear of the operator, indicating a high likelihood of functional use of the portable device. In another embodiment, the monitoring algorithm records information corresponding to the time a first software application was started on the portable device, information corresponding to the stopping, starting, or closing of the application, interactive use of the application, background use of the application, non-interactive use of the application, duration of the use of the application, quality of application use (which can be evaluated based on a previous measurement of quality (number of typographical errors for example) or efficiency of application use (number of seconds required to input 10 words using an SMS texting application, for example). In another embodiment, the monitoring algorithm monitors vehicle sensor information (such as information from a camera processed to provide the field of view of the driver, gaze tracking, or eye-tracking) or the use of one or more vehicle operation functions (throttle position sensor, brake pedal sensor, etc.), vehicle features (windshield wiper use, turn signal use, audio system use, navigation system use, etc.) or vehicle user interface devices (display touchscreen, audio system volume dial, heated seat temperature dial, etc.) by communicating with one or more sensors or user interface components of the vehicle (such as by a wireless Bluetooth™ connection to the OBD system of the vehicle).

In another embodiment, the monitoring algorithm differentiates between voice activated software or device feature use (such as voice activated calling, texting, or navigation using the portable device or the vehicle, or using a voice active wired or wireless accessory in communication with the portable device and/or vehicle) and physical interaction with the portable device (such as by using a touchscreen), vehicle (such as by using a console), or wired or wireless accessory in communication with the portable device and/or vehicle for feature use or for use of the software application executed by a processor on the portable device and/or vehicle.

Vehicle Operator Identification

In one embodiment, the portable device, vehicle, or system determines or estimates the probability or determines if the portable device operator is simultaneously operating the vehicle, or estimates the probability or determines if the operator of the vehicle is simultaneously operating a portable device using a vehicle operator identification algorithm. In one embodiment, the system uses proximity or location sensing to determine the location within the vehicle of the portable device while the portable device is in use and the vehicle is being operated. The proximity or location information for the portable device relative to the vehicle can be used in combination with the layout of the vehicle or system parameters for the operating position for the vehicle and the state or movement information of the vehicle and/or portable device to determine or estimate the probability that the operator of the portable device is operating the vehicle or that the operator of the vehicle is operating the portable device.

The proximity or location sensing of the portable device relative to the vehicle (or more specifically relative to the operator's seat or position for the vehicle) can be determined using radio waves, acoustic techniques, ultrasonic techniques, lidar techniques, radar techniques, imaging techniques, triangulation, signal delay methods, seat occupancy sensors, near field communications device, camera, microphone, using third party devices, a docking device or station, operator admission, operator verification or questionnaire, operator voice identification, devices or methods external to the vehicle (such as street light cameras, police cameras, police reports, etc.) or devices or methods that are part of the vehicle (such as biometric sensors, voice identification, etc.).

Cognitive Capacity

In one embodiment, a system processor, a portable device processor, a vehicle processor, or a processor external to the vehicle and portable device but in communication with the vehicle and/or portable device executes a cognitive capacity algorithm that estimates or measures the cognitive capacity of the vehicle operator and/or portable device operator. The cognitive capacity for an individual is the total amount of cognitive processing ability or mental effort a person has to expend on mental tasks at an instance in time. The cognitive capacity can be evaluated using a measurement, metric, or quantitative neurophysiological expression. In one embodiment, the cognitive capacity is estimated or determined using a cognitive capacity algorithm executed on a portable device processor, a vehicle processor, or a processor on a remote device using input information from one or more sensors and/or user interface components (on the device and/or vehicle) and optionally information from other sources (such as maps, statistical data or functions, historical vehicle operation performance data for the vehicle operator or other vehicle operators, for example). In one embodiment, the cognitive capacity of the vehicle operator and/or portable device operator is determined by measuring the heart rate (such as by one or more sensors on the steering wheel, other vehicle control device, or wearable device such as a smart watch) and blood pressure (such as by using an optical sensor on a smart watch portable device that measures the systolic and diastolic blood pressure of the wearer) and evaluating the product of the heart rate and systolic blood pressure (heart rate-blood pressure product (RPP)).

The cognitive capacity measurement or estimation for the operator of the vehicle and/or portable device can be performed prior to operating the vehicle and/or device or during the operation of the vehicle and/or device. In one embodiment, the cognitive capacity is measured or estimated in a controlled environment with the operator performing one or more selected tasks such as may be presented by a software program. In another embodiment, the cognitive capacity is evaluated over a period of time (such as over a period of 2 weeks or 5 vehicle operations or trips) and the cognitive capacity is determined by analyzing recorded data from one or more sensors. In another embodiment, the cognitive capacity is measured or estimated by the cognitive capacity algorithm using input information from one or more selected from the group: self-report scales, response time to secondary visual monitoring task, eye deflection monitoring, difficulty scales, cognitive ability test, brain imaging techniques, magnetoencephalography (MEG), simulation performance measurements, empirical measurements of successful performances of tasks requiring cognitive loads, using a detection response task, measuring reaction time and miss rate (or other measurement of unsuccessful task completion) of a primary task while simultaneously performing a secondary task.

In one embodiment, data from one or more measurements (and optionally information from sources internal or external to the portable device and/or vehicle) is extrapolated to determine the cognitive capacity of the operator. The cognitive capacity may be evaluated based on a threshold such as a reaction time less than a first reaction time threshold and a successful response rate higher than first successful response rate (such as 90% accurate completion) or an unsuccessful response rate less than a threshold unsuccessful response rate.

In one embodiment, the portable device and/or vehicle initiate a test or measurement of one or more primary and/or secondary tasks (using one or more sensors, internal or external information) to determine, estimate, and/or extrapolate the cognitive capacity of the vehicle operator and/or portable device operator. In one embodiment, the cognitive capacity algorithm measures or estimates the cognitive capacity of the operator using a historical analysis of the vehicle operation performance by the operator. In this embodiment, the analysis may include analysis of one or more successful task metrics, unsuccessful task metrics, task quality metrics, and/or vehicle operation performance task completions while operating the portable device.

In one embodiment, the cognitive capacity algorithm receives cognitive capacity input information and measures or estimates the cognitive capacity of the operator. The cognitive capacity input information may include current or historical information: received from one or more vehicles, portable devices, or external device sensors; received from one or more user interface features of the vehicle and/or portable device; received from an external server or device; related to the mental or physical condition of the operator; or related to the age, education, or health of the operator. In one embodiment, the cognitive capacity algorithm updates the estimation or measurement of the cognitive capacity of the operator at regular intervals, at irregular intervals, before operation of the vehicle or portable device, during the operation of the vehicle and/or portable device, or at times between operations of the vehicle. For example, in one embodiment, the cognitive capacity algorithm is executed on a portable device processor when one or more sensors indicate a change in physical or mental condition of the vehicle operator (such as sensors that determine sleepiness such as cameras, eye tracking software, or sensors that detect or provide information related to the blood alcohol level of the vehicle operator or the alcohol level in the air within the vehicle). In one embodiment, the cognitive load of the operator for a series of historical vehicle operation events is analyzed to estimate the cognitive capacity. In one embodiment, statistical data from measurements of the cognitive load and/or cognitive capacity of other portable device and/or vehicle operators is used to estimate or extrapolate the cognitive capacity of the vehicle operator in question. For example, the success rate or accuracy data and data corresponding to the use of one or more portable device features for a current vehicle operator simultaneously operating a portable device may be compared with similar historical data from other vehicle operators (where the cognitive capacity may be known, estimated, or validated) to estimate the cognitive capacity of the current operator. In this example, an application on a portable device may transmit current sensor, vehicle, user interface or device information to a server comprising historical cognitive load and/or cognitive capacity data correlated with a plurality of users wherein the server provides the current cognitive load, cognitive capacity, historical information, or related information (such as a new insurance rate based on the current conditions) to the portable device.

The cognitive capacity algorithm may utilize current data, historical data, empirical data, and/or predictive data to perform the analysis and generate the cognitive capacity. In one embodiment the cognitive capacity algorithm estimates or measures the cognitive capacity of the vehicle operator based on a requirement of safe operation of a vehicle. The requirement for safe operation of the vehicle may contribute a safety factor in the calculation or estimation of the cognitive capacity (the cognitive capacity for safe vehicle operation). For example, in one embodiment, the cognitive capacity algorithm applies a 90% safety factor to the current cognitive capacity value for the vehicle operator to result in a cognitive capacity value for safe vehicle operation that is 90% of the value of the cognitive capacity without accounting for a safety factor. The safety factor may be a value estimated or statistically shown to be a factor that correlates with safe vehicle operation performance when applied to a cognitive capacity value for the cognitive analysis algorithm to use to determine the risk, danger, information transfer, or response from the portable device and/or vehicle.

Cognitive Load

In one embodiment the portable device or system comprising the portable device measures the cognitive load for vehicle operation and/or the cognitive load for portable device use (portable device feature use and/or use of one or more software applications or software components accessible using the portable device). The cognitive load for a given task refers to the amount of cognitive processing or mental effort imposed on a person's cognitive ability at an instance in time for the given task or set of tasks (such as the task of operating a vehicle or the task of operating an application or functional feature of a portable device).

The cognitive load can be evaluated using a measurement, metric, or quantitative neurophysiological expression. In one embodiment, the cognitive load is estimated or measured using a cognitive load algorithm executed on a portable device processor, a vehicle processor, or a processor on a remote device using input information from one or more sensors and/or user interface components (on one or more devices and/or the vehicle) and optionally information from other sources (such as maps, statistical data or functions, historical vehicle operation performance data for the vehicle operator or other vehicle operators, for example). In one embodiment, the cognitive load for operating the vehicle or phone use is determined or estimated by the cognitive load algorithm by measuring the operator's heart rate (such as by one or more sensors on the steering wheel, other vehicle control device, or a wearable device such as a smart watch) and the operator's blood pressure (such as by using an optical sensor on a smart watch portable device that measures the systolic and diastolic blood pressure of the wearer) and evaluating the product of the heart rate and systolic blood pressure (heart rate-blood pressure product (RPP)).

In another embodiment, the cognitive load is measured or estimated by the cognitive load algorithm from input information from one or more selected from the group: self-report scales, response time to secondary visual monitoring task, difficulty scales, cognitive ability test, brain imaging techniques, magnetoencephalography, eye deflection sensing, simulation performance measurements, empirical measurements of successful performances of tasks requiring cognitive loads, using a detection response task, measuring reaction time and miss rate (or other measurement of unsuccessful task completion) of a task. In one embodiment, the cognitive load estimation is based in part on sensor information (such as information from cameras or gaze or attention tracking systems monitoring the gaze or attention of the operator of the vehicle such as a set of glasses that monitors eye movement, and/or portable device).

In one embodiment, the cognitive load algorithm measures perceived mental effort and uses the perceived mental effort as an index for cognitive load. In another embodiment, the cognitive load algorithm measures or receives performance information related to the operational task, such as for example, the cognitive load algorithm receiving vehicle operation performance information from the vehicle operation performance algorithm. The cognitive load algorithm may utilize current data, historical data, empirical data, and/or predictive data from one or more algorithms disclosed herein to perform the analysis and generate the cognitive load.

In one embodiment, the system for evaluating risk or evaluating vehicle operation performance comprises one or more sensors that provide information to a cognitive load algorithm that provides cognitive load information for analysis (such as analysis by a cognitive analysis algorithm).

Cognitive Load for Vehicle Operation

In one embodiment, the cognitive load for an operator operating a vehicle is measured or estimated by the cognitive load algorithm from current or historical input information from one or more selected from the group: historical cognitive load information for the operator; sensor information from portable device sensors (such as the isolated speed of the vehicle determined by a GPS sensor on the portable device, the movement isolation algorithm executed on the portable device processor, information from a portable device camera processed to determine that the operator is looking at the portable device at the current instant or for a period of time, or eye tracking or gaze sensors in a portable or wearable device), vehicle sensors (such as the vehicle GPS and accelerometer sensors, speed sensor, eye tracking sensor, rain sensors, vehicle interior temperature sensor, or information from a vehicle camera processed to determine that the operator is looking at the portable device at the current instant or for a period of time, for example), or sensors external to the vehicle and portable device (such as traffic information, weather information, or speed camera information, map information (route, topography, speed limits, etc.) obtained from a server remote from the vehicle; vehicle user interface or vehicle function feature information (such as information from the vehicle OBD system that the switch or button was pressed to roll down the windows, the vehicle display touch screen was pressed more than 10 times in a minute, the audio system loudness was selected to be greater than 50 decibels, or a switch was activated to turn on the windshield wipers, for example); vehicle condition information; vehicle operation complexity analysis; reaction time information; and historical operation performance data (such as the operator of an automobile historically drifting from their lane when answering a phone call). In one embodiment, the cognitive load algorithm correlates the temporal movement information with other cognitive load input information to determine the cognitive load.

The vehicle operation complexity analysis comprises information that relates to the current context and complexity of performing successful operation of the vehicle and may include one or more factors selected from the group: environmental factors (such as rain, condition of the road, or traffic, for example); condition of the vehicle; lane choice; route choice; statistical accident data for the vehicle; statistical accident data for the route segment; statistical accident data for time period chosen for the trip (such as a holiday weekend, rush hour, etc.); operator health information (such as vehicle operator requires glasses or contacts for safe driving); operator experience level; and trip properties (duration, distance, number of stops, start time, end time, etc.).

Two or more of the aforementioned current or historical information input used to measure or estimate cognitive load for vehicle operation or operation of a portable device while operating a vehicle may be used in combination to measure, estimate, or provide more accurate cognitive load information. For example, second input information may provide contextual information for the first task and the cognitive load may be adjusted by the cognitive analysis algorithm. For example, current vehicle operation performance information may be combined with current sensor data from the vehicle indicating that it is raining (such as windshield wiper use or rain sensors) such that the cognitive load is adjusted higher since the operator is operating the vehicle in the rain.

As an example, the cognitive load estimated by the cognitive load algorithm for operating a 1 year old vehicle on a clear sunny day at noon with no traffic on a straightaway section of a four lane highway while travelling 45 miles per hour with the radio off would be much lower than the cognitive load for operating a 15 year old vehicle in disrepair at 65 miles per hour with a high volume of traffic at night when it is raining on a curvy highway with the radio on with other factors being substantially equal.

In one embodiment, the cognitive load for operation of the vehicle is measured or estimated over a period of time (such as over a period of 2 weeks or 5 vehicle operations or trips) and the cognitive load for current operation of the vehicle is determined by analyzing the data from one or more sensors and/or user interface features and comparing the data with the historical measurements.

Cognitive Load for Portable Device Use

In one embodiment, the cognitive load for an operator operating a software application or a functional feature of a portable device is measured or estimated by the cognitive load algorithm from current or historical input information from one or more selected from the group: historical cognitive load information for the operator (such as historically slow button pressing for text input from the keypad); sensor information from portable device sensors (such as the orientation of the portable device, number of times the touchscreen is pressed or swiped in a 30 second period, location of the portable device (in a dock, in the lap of the operator, off to the side, near the top of the steering wheel of a car, etc.); isolated speed or temporal and/or spatial movement information of the portable device determined by the movement isolation algorithm executed on a processor (portable device processor, vehicle processor, or other device processor) with input from sensors such as accelerometers, digital compass, and gyroscope sensors on the portable device; sensor information from one or more vehicle sensors (such as sensors within the vehicle triangulating the location of the portable device with respect to the vehicle, vehicle interior temperature sensors, cameras detecting the use of the left or right hand for portable device operation or that the user is wearing sunglasses (such as polarized sunglasses which can reduce display visibility for some portable display types); the use or non-use of eye glasses or contact lenses; other vehicle sensor information provided to the portable device (such as to improve or verify the accuracy of a measurement by one or more portable device sensors); portable device user interface or portable device function feature information (such as the portable device display type, display size, display pixel format, display resolution, button, screen, or user interface location on the device, volume level, brightness level, contrast level, communication protocol (such as International Telecommunications Union-Radio communications sector 4G standard or 802.11WiFi communication standard) which can affect the speed of application or feature operation and the time required for task completion or cognitive load, radio communication signal strength for the current location (which may also affect the speed of task completion), memory capacity, plug-in power adapter or docking station in use, current memory usage, maximum memory available, processor speed, sensor accuracy, battery power remaining, data input method (physical keypad, touchscreen, swipe method, etc.), voice input use, portable device display use, portable device speaker use, portable device microphone use, portable device touchscreen use, portable device user interface use; external device or accessory user interface use for interfacing with the portable device such as augmented display use (such as a HUD, wearable display, or head mounted display), user interface accuracy, user interface sensitivity, headset use, headphone use, user interface accessory use, vehicle display use, vehicle microphone use, vehicle speaker use, vehicle touchscreen use, and vehicle user interface use; portable device condition information (scratched or broken screen, sticking buttons, number of operating system failures per week, for example); portable device software complexity analysis information; reaction time information; historical portable device operation performance data (such as the operator of portable device historically driving safely while having phone conversations); historical cognitive load estimations or measurements for the portable device feature or software application for the operator and/or cognitive load data or statistical data from other operators using the same, similar, or different device and the same, similar, or different application or application type. Two or more of the aforementioned current or historical input information may be used in combination to measure, estimate, or provide more accurate cognitive load information for a task such as use of a portable device. For example, second input information may provide contextual information for the first information and the cognitive load may be adjusted by the cognitive analysis algorithm as a result. For example, current portable device operational use information including information such as the portable device set in a fixed low brightness display mode may be combined with photosensor data from the device indicating that it is a very bright ambient environment (the sun shining on the device, for example), such that the cognitive load for operating the portable device is adjusted higher since the display contrast on the portable device is reduced and the display is harder to read. In another example, cognitive load input information indicating that the operator of the portable device is texting may be analyzed with cognitive load input information indicating that the operator of the device is operating a vehicle while texting to increase the estimated cognitive load for operating the vehicle and/or the portable device (or reduce the available cognitive capacity for the operator). In this example, the estimated cognitive load or available cognitive capacity may be further adjusted based on additional cognitive load input information such as input from rain sensors indicating that the vehicle operator is operating the vehicle in the rain.

The portable device software complexity analysis comprises information relating to the degree of complex interaction required to interface with the software or algorithm accessible to the portable device and process information from the software or algorithm. The analysis may include software properties and the user interface used to access the software or software components, such as: software appearance; software font size; software icon size; which software or software components(s) are used; speed of the software execution; graphical complexity; contrast; complexity of information presented; complexity of information processing required (reading an email typically requires a higher cognitive load than viewing pictures, for example); response time required for software interface (playing a game on a portable device or talking on a cellular phone typically requires a faster reaction time than browsing through pictures by swiping the touch interface at the operator's leisure, for example); user interface method used (replying to an email by generating a text response using a portable device touchscreen requires a higher cognitive load than vocally answering a question posed during a phone call using a car's speaker system and microphone connected to a cellular phone via a Bluetooth™ connection, for example); environmental factors (such as ambient luminance levels where the display is more difficult to read on a bright sunny day than at night, ambient temperature, ambient audio loudness, bumpy road or road conditions, vehicle condition (such as windows open and vehicle speed generating interior wind, etc.); estimated, defined, or unknown duration of software use; statistical software cognitive load measurements or estimations from the operator or other operators of the software on the same, similar, or different portable devices; statistical data from the cognitive load estimated or measured for the operator or other operators using the software or function feature under one or more of the aforementioned software properties or user interface methods employed.

The measurement or estimation of cognitive load for portable device use may be measured in real time or at intervals during operation of the portable device. In one embodiment, the cognitive load for operation of the portable device is measured or estimated over a period of time, such as the period of time of the current instance use, over two or more previous use instances, or over the use instances during a period of 1 week, for example. In one embodiment, the cognitive load for current operation of the portable device is determined in part by analyzing the data from one or more sensors and/or user interface features of the portable device and comparing the data with the historical measurements.

Cognitive Analysis Algorithm

In one embodiment, a cognitive analysis algorithm evaluates the cognitive capacity, the cognitive load for operating the vehicle and the cognitive load for portable device. As a result of the analysis performed by the cognitive analysis algorithm, the portable device or vehicle may respond with an alert or provide information using an information transfer medium; limit or modify one or more functions, features, or the ability to use one or more software or applications of the portable device; or provide information to the operator, a second party, or a third party.

In one embodiment, a system comprising a portable device measures or estimates the cognitive capacity of the operator of the portable device and/or the operator of the vehicle, measures or estimates the cognitive load for operating the vehicle safely, and the cognitive load required to operate one or more functions, features or software components or applications accessible using the portable device. In this embodiment, warnings, alerts, information, or notifications may be provided to the operator for a net deficit of cognitive attention where the result of the cognitive load for operating the portable device subtracted from the cognitive capacity of the operator is less than the cognitive load for safe operation of the vehicle. Similarly, restrictions on the use of the portable device may be implemented by the portable device based on this equation and optionally the legal status of operating the portable device while operating the vehicle for the location of the vehicle. The cognitive analysis algorithm may utilize current data, historical data, empirical data, and/or predictive data to perform the analysis.

In one embodiment, the cognitive analysis algorithm evaluates the risk associated with vehicle operation by subtracting the cognitive load for operating the portable device from the cognitive capacity of the operator and comparing the result to the cognitive load required to safely operate the vehicle simultaneously under current conditions. In this embodiment, if the result is less than the cognitive load required for safe operation of the vehicle, the portable device may provide an alert or information, the vehicle may provide an alert or information, the portable device may limit a feature or function of the portable device (such as the ability to make, receive or continue a telephone call), the portable device may limit features or functionality within the vehicle, and/or the portable device may transmit the cognitive information, related information, or other information to a remote server (such as a wireless communication service provider server or an insurance company server where the insurance rate may increase due to the indication of unsafe driving).

In one embodiment a method of generating risk related information at a first time for an operator of a vehicle comprises estimating a cognitive capacity of the operator of the vehicle; estimating a first cognitive load required for the operator to operate the vehicle; estimating a second cognitive load required for the operator to use one or more software applications accessible using a portable device or to use one or more functional features of a portable device; and generating a first risk assessment based on the difference between the cognitive capacity and a sum of the first cognitive load and the second cognitive load.

In one embodiment, a system for generating risk related information provides a response or risk related information for providing insurance to an operator of the vehicle. In one embodiment, a system for generating risk related or underwriting information for providing insurance to an operator of a vehicle comprises: a portable device comprising at least one accelerometer and a non-transitory computer-readable storage medium comprising accelerometer information received from the at least one accelerometer; a first processor executing an algorithm on the accelerometer information extracting first information correlating to the movement of a vehicle and second information correlating to the movement of the portable device relative to the vehicle; a second processor estimating a first cognitive load for the operator to operate the vehicle using the first information; a third processor estimating a second cognitive load for the operator to use one or more software applications accessible using the portable device or to use one or more functional features of the portable device; and a fourth processor estimating a cognitive capacity of the operator of the vehicle, wherein when the combination of the first cognitive load and the second cognitive load is greater than the cognitive capacity of the operator, the portable device: provides an alert to the operator; provides the first cognitive load to an external server; provides the second cognitive load to an external server; provides the cognitive capacity to an external server; modifies the functionality of the portable device; or modifies an ability of the operator to use the one or more software applications.

In one embodiment, using the cognitive analysis algorithm, the portable device and/or vehicle responds to an increased vehicle operation risk or the potential for increased vehicle operation risk. In this embodiment, the method for responding to increased operational risk for an operator of a vehicle comprises estimating a cognitive capacity of the operator of the vehicle; estimating a first cognitive load required for the operator to operate the vehicle; estimating a second cognitive load required for the operator to use one or more software applications accessible using a portable device or to use one or more functional features of a portable device; and performing an analysis of the first cognitive load, the second cognitive load, and the cognitive capacity such that when second cognitive load is greater than the difference between the cognitive capacity and the first cognitive load, an alert is provided to the operator of the vehicle, the portable device communicates information to a remote server, use of the one or more software applications is limited, or use of the one or more functional features of the portable device is limited.

In one embodiment, a method for evaluating a cognitive ability of a driver for safe operation of vehicle when using a portable device comprises estimating a cognitive capacity of the operator of the vehicle; estimating a cognitive load required for the operator to use one or more software applications accessible using the portable device or to use one or more functional features of the portable device; and deriving a cognitive reserve remaining for the operator of the vehicle to devote to safely operating the vehicle based on the cognitive capacity and the cognitive load.

In one embodiment the cognitive analysis algorithm factors into the analysis a safety factor. For example, while an analysis of the full cognitive capacity of the vehicle operator and the cognitive load for operating the portable device may suggest that there is sufficient cognitive reserve for the cognitive load for operating the vehicle, a safety factor may be applied to increase the likelihood that the vehicle will be operated safely. In one embodiment the safety factor is applied to the cognitive capacity to effectively reduce the cognitive capacity. In another embodiment, the safety factor is added to the cognitive load for operating the vehicle to effectively increase the cognitive load for safely operating the vehicle.

Cognitive Load for Other Tasks

In one embodiment, the cognitive analysis algorithm input includes cognitive load information for one or more other tasks (such as a third task) performed by the operator at the same time as operating the vehicle and portable device (first and second tasks). In one embodiment, the cognitive load algorithm estimates or measures the cognitive load for the third task. Input information sources for estimating the cognitive load (or risk) from the third task may be from any of the aforementioned cognitive load input information sources. The cognitive load for other tasks measured or estimated by the cognitive load algorithm may be reduced from the cognitive capacity to provide a new cognitive capacity for operating the vehicle and/or portable device. Similarly, operation of the portable device may be restricted due to the cognitive load of the other task summed with the cognitive load for operating the vehicle and the result subtracted from the cognitive capacity being larger than the cognitive load estimated for operating the portable device. The cognitive load for one or more additional tasks (such as a third task) may be analyzed, estimated, or weighted using cognitive load input information for one or two tasks (such as vehicle operation use and mobile device use, for example) and additional cognitive load input information that provides contextual information for one or more tasks. Cognitive load input information related to one task may provide contextual cognitive load input information for a second task different from the first task. For example, the visor light use indicator and analysis of in-car camera images indicates the operator of the vehicle is putting on makeup (third task) with the visor in the down position while driving (first task) and using the vehicle Bluetooth microphone for a phone call (second task) all at the same time. In this example, the cognitive load for driving may be increased (or the cognitive capacity available decreased) due to reduced visibility with the driver's visor in the down position. In this example, the driver's visor in the down position provides contextual information that can increase the cognitive load for operating the vehicle and/or reduce the cognitive capacity available due to the increased cognitive load for operating the vehicle).

In another example, a vehicle mounted interior camera sensor may detect that the vehicle operator is putting on makeup or consuming food while operating the vehicle and on a phone call using the vehicle speaker and headset via a Bluetooth™ connection. In another example, the vehicle OBD system provides information to the portable device cognitive load algorithm that the vehicle operator is operating the touchscreen for the dashboard display at a continuous high rate (such as when performing numerous interactions with a navigation display or searching through numerous radio channels or interacting with a listing of available music files for the audio system).

Risk Assessment

In one embodiment, a risk assessment is performed by a risk assessment algorithm that may include a predictive algorithm, and may use input from one or more selected from the group: cognitive analysis algorithm, monitoring algorithm, cognitive load algorithm, cognitive capacity algorithm, legal analysis algorithm, one or more other algorithms disclosed herein, information directly or indirectly from one or more devices such as a remote server or sensors or user interface devices of the portable device, vehicle, or other device. In one embodiment, the system provides a risk assessment using a risk assessment algorithm executed on a processor on the portable device, the vehicle, or a remote device. In one embodiment the risk assessment algorithm receives input in the form of historical information, current information, or predicted future information from one or more selected from the group: the vehicle operation performance algorithm; the cognitive analysis algorithm; the movement isolation algorithm; one or more sensors on the vehicle (such as information from a camera processed to provide the field of view of the driver, gaze tracking, or eye-tracking), portable device, and/or a remote device; one or more user interface components of the vehicle and/or portable device; and/or devices or servers external to the vehicle (such as servers providing data from speeding cameras, traffic violation reports, external map information, weather information; vehicle information; vehicle condition information; personal information related to the operator; environmental information; statistical or raw vehicle operation data from the current operator, or statistical or raw vehicle operation data from other vehicle operators).

In one embodiment, a risk profile and/or vehicle operation performance profile for the vehicle operator is generated using the aforementioned input to the risk assessment, the output from the risk assessment algorithm, and/or the vehicle operation performance algorithm output. The risk profile and/or vehicle operation performance profile may be used to assist in the analysis of current operational risk; used by a third party to provide a service or for other purposes (such as alerting a police officer or other drivers of dangerous driving behavior); or to assist in the determination of an appropriate price for insurance for vehicle operation for the operator, for example. In one embodiment, the risk profile comprises information input into vehicle operation performance algorithm (such as speed, acceleration rate, isolated vehicle movement information indicating a swerve, deceleration rate, for example), information output from the vehicle operation performance algorithm (such as a rating) and output from the cognitive analysis algorithm (such as the vehicle operator drives unsafely when sending text messages, receiving calls from a specific individual, or uses a specific software application on a portable device while operating a vehicle). In this embodiment, for example, the output from the cognitive analysis algorithm may be correlated with the output from the vehicle operation performance algorithm to generate a risk assessment or risk related information that can be used for a response, alert, to provide information to a second party or third party. For example, the vehicle operation performance algorithm may determine that the vehicle operator talking on the phone operates the vehicle in an unsafe manner while talking on the phone due to an increase in traffic (increased cognitive load for operating the vehicle). The information in this example, which can be generalized to conclude that the operator operates the vehicle poorly while talking on the phone in heavy traffic, can become part of the risk profile and/or vehicle operation performance profile.

In one embodiment the risk assessment algorithm assesses risk by correlating the use of the portable device (such as information correlating to the use of a function or feature of the portable device or a software component or application accessible using the portable device) with vehicle operation performance. In another embodiment the risk assessment algorithm assesses risk by correlating one or more elements of the cognitive load information (such as cognitive capacity, cognitive load for operating the vehicle, cognitive load for operating the portable device, cognitive deficit, or cognitive surplus) with vehicle operation performance.

In one embodiment, the risk assessment output from the risk assessment algorithm is a risk score, provides information used in the generation of a risk score, provides information used in the generation of insurance underwriting or pricing, provides risk related information to a second or third party, or provides information used to respond to one or more events (such as providing an alert, modifying a portable device function, or restricting the use of one or more software components or applications accessible using the portable device). In one embodiment, the risk assessment algorithm provides feedback information for the vehicle operator to identify safe operating habits (or unsafe operating habits). Similarly, the information may be used as part of a safe driving or driving instructional program or service.

In one embodiment, input information for the risk assessment algorithm comprises one or more current and/or historical information types selected from the group: operator personal information (such as age, gender, or health condition, for example, which may be obtained directly through a third party service, registration process, insurance records, or may be inferred from the cognitive capacity algorithm); environmental information (such as weather conditions, traffic condition, or vehicle condition, for example) which may be obtained directly (such as from a sensor or a remote server) or from a third party service or from the vehicle operation performance algorithm or the cognitive load information algorithm for operating the vehicle, for example; sensor information from the portable device, vehicle, or an external device; externally derived data (second party information or third party information) including empirical or statistical risk related information or vehicle operation performance information accessed from the portable device (and/or vehicle) non-transitory computer readable storage medium or from a remote server that corresponds to one or more other vehicle operators with similar personal information, with similar operational environments, with similar cognitive analyses, and/or with similar vehicle operation performance information; cognitive analysis information from the cognitive analysis algorithm; and vehicle operation performance information which may be obtained directly (such as from one or more sensors or a remote server) or from the vehicle operation performance algorithm.

In one embodiment, a system for dynamically assessing risk comprises: a portable device comprising a plurality of sensors operatively configured to provide movement information related to the movement of the portable device; and a first processor executing risk assessments at a first time and a second time, the risk assessments including the movement information and an estimation of the cognitive capacity of the operator, the cognitive load for operating the vehicle, operating vehicle features and functions, and the cognitive load for using one or more software applications accessible using the portable device or one or more functional features of the portable device.

Legal Analysis Algorithm

In one embodiment, the system comprises a processor executing a legal analysis algorithm. The legal analysis algorithm receives input from one or more sources and determines the legal restriction for using one or more phone features or functions, one or more software components or applications, and/or one or more vehicle functions or features while operating the vehicle in its current location. In one embodiment, the legal analysis algorithm output provides information to one or more algorithms, devices, or third party devices; provides (or provides information for) an alert, a notification, or response indication information related to the legal restriction; and/or limits or prevents the use of a portable device feature or function, a vehicle feature or function, or a portable device software or software component by the portable device operator while operating the vehicle. The legal analysis algorithm may receive input information from external sources (such as a data server with mapping information and legal jurisdictional boundaries, a data server with legal information related to use of one or more portable device features or functions or a portable device software or software component by the portable device operator while operating the vehicle for one or more jurisdictions); one or more sensors or user interface components of the portable device and/or vehicle (such as a headset use indicator, voice activated dialing indicator, vehicular speaker and microphone use indicator, a touchscreen or accelerometer, for example); or one or more sensors external to the vehicle (such as a speed camera or speed detector, for example). For example, a vehicle operator operating a cellular phone by hand (determined, for example by the isolated portable device movement information from the movement isolation algorithm) in a first jurisdiction is alerted just before entering into a second jurisdiction (known using mapping information and GPS sensors) that the call must be continued using a hands-free device due to legal restrictions in the second jurisdiction (as determined for example from mapping data, GPS sensors, and a database on a remote server with jurisdictional legal restriction information). In another example, the legal analysis algorithm prevents a vehicle operator from operating the portable device without a hands-free device such as a headset or vehicle mounted speaker and microphone system in a jurisdiction that legally requires the use of a hands-free device while operating a portable device (such as a cellular phone) while operating a vehicle (such as an automobile). In another embodiment, the legal analysis algorithm determines that the vehicle operator is operating the vehicle in a dangerous and/or illegal manor and information related to the vehicle identification, location, vehicle movement information, operational performance, etc. may be transmitted to a third party (such as a law enforcement or other governmental organization).

Third Party Portable Device Restriction Algorithm

In one embodiment, the system comprises a processor executing a third party portable device restriction algorithm. The third party portable device restriction algorithm receives input from one or more third party sources and restricts or prevents the use of one or more portable device features or functions or one or more portable device software or software components by the portable device operator while operating the vehicle. In one embodiment, the third party portable device restriction algorithm output provides information to one or more algorithms, devices, or third party devices; provides (or provides information for) an alert, notification, or response indication information related to a third party restriction; and/or limits or prevents the use of a portable device feature or function, or the portable device software or software component by the portable device operator while operating the vehicle. The third party portable device restriction algorithm may receive input information from external sources such as a data server with mapping information and third party restrictions (such as a phone feature use restriction while operating the vehicle on a highway according to guardian restrictions); a server providing restricted phone features or software application usage restrictions for a specific automobile insurance plan; or a server providing business entity phone feature, function, or portable device software component or application use restrictions while operating a business entity vehicle, for example. Additionally, the third party portable device restriction algorithm may receive input information from one or more sensors or user interface components of the portable device and/or vehicle (such as a headset use indicator, voice activated dialing indicator, vehicular speaker and microphone use indicator, a touchscreen or accelerometer, for example); one or more sensors external to the vehicle (such as a speed camera or speed detector, for example). For example, a vehicle operator may be restricted from operating a cellular phone by hand (determined, for example by the isolated portable device movement information from the movement isolation algorithm) due to restrictions required to maintain a specific insurance rate. In another example, a minor may be prohibited from using a phone to make or receive a call when the third party portable device restriction algorithm determines that the vehicle is traveling at rate greater than 40 miles per hour and the minor's parents have this restriction as programmed on the device or indicated from information from a remote server.

Communication with Remote Server

In one embodiment, a processor on the portable device and/or vehicle sends or receives information from a server remote from the vehicle. In one embodiment, the portable device transmits information to the vehicle and the vehicle transmits information to a remote server, or the vehicle receives information from a remote server and transmits information to the portable device. In one embodiment, the server is a third party server such as a third party risk assessor server, a computing services provider sever (such as a cloud computing server), a remote configuration server, a data aggregator server, a third party risk assessor server, a government server; a local, state, or federal police, law enforcement or security server, a party of interest (such as a parent or guardian), or a second party server (such as an insurance company server, a server of a vehicle lessor, a server of an employer of the vehicle operator or the vehicle owner, the server of a cellular phone voice and/or data server provider, the operating system provider for the portable device, the portable device hardware provider, or the software application provider). In one embodiment, the communication with one or more remote servers is facilitated through the use of radio signals in the form of one or more channel access schemes, data protocols or transmission methods such as packet oriented mobile data service on a cellular communication system (such as general packet radio service GPRS) or a mobile phone mobile communication technology standard (such as 4G or Mobile WiMAX,) or other communication standard such as IEEE 802.11 or WiFi. The form of the data or data packet may include short messaging service, multimedia messaging service, html data, file transfer protocol (FTP), Transmission Control Protocol (TCP) and/or Internet Protocol (IP), or other known communication technology, protocol, method, carrier, or service.

In one embodiment the communication with the server occurs during the operation of the vehicle and/or portable device, in real time, at fixed or irregular intervals (such as once an hour) or periods of time (such as the last day of the calendar month), or before or after a trip or vehicle operation session. In one embodiment, data recorded by the portable device and/or vehicle is recorded and transmitted at a particular event or time interval.

Insurance Underwriting Based on Driver Performance

In one embodiment, the risk assessment provides information for insurance underwriting for the vehicle operator. In one embodiment, the insurance model is a try before approval for underwriting where information (such as risk assessment information or vehicle operation performance information) is collected from the portable device (and/or vehicle) over a period of time in order to evaluate the risk and/or driver performance before underwriting and/or before setting the price for underwriting. In another embodiment, the vehicle operator may operate the portable device and/or vehicle during a probationary period. In another embodiment, the vehicle operator may operate the portable device and/or vehicle as remediation or as a condition of being able to keep insurance coverage wherein one or more algorithms suggests corrective actions to improve safe vehicle operation (such as by indicating to stop using one or more portable device features or functions, for example) and can report driving performance back to the insurer. In another embodiment, the insurance rate and/or risk information is updated and/or communicated in real-time or adjustments to the insurance rate or risks are performed every minute, hourly, daily, monthly, quarterly, or yearly while operating the vehicle and/or while not operating the vehicle.

Portable Device Operator Alert

In one embodiment, the portable device and/or vehicle provide an alert, notification, or information using an information transfer medium. In one embodiment, the alert, notification, or information transfer medium comprises information that alerts the operator of the portable device to increased risk or danger associated with the use of one or more software applications or one or more functional features of the portable device during the operation of the vehicle. In another embodiment, the alert, notification, or information transfer medium comprises information that alerts the operator to allowed, disallowed, legal, or illegal portable device functional features or software applications. In a further embodiment, the alert, notification, or information transfer medium comprises information that alerts the portable device operator (before or during operation of a vehicle) based on a potential danger, risk assessment, third party restriction, insurance rate plan restriction, or illegal activity when entering (or a plan or route suggests entering) an area where the use of one or more software applications or one or more functional features of the portable device during the operation of the vehicle. In a further embodiment, an application executed on the portable device or vehicle alerts, notifies, or provides information through an information transfer medium that indicates permissibility of activities such as texting, emailing, navigating, talking while driving, etc. based on the current location and/or expected route of travel.

In one embodiment, the alert, notification, or information transfer medium comprises information that alerts the operator of the portable device to potentially dangerous vehicle (or portable device) operation based on information received from one or more sensors. Examples of sensor information include a vehicle camera detecting that the vehicle is about to cross the median, sensor information from an onboard vehicle camera suggests the driver may be falling asleep, sensor information from a portable device or vehicle camera that the operator has been viewing the portable device for a long time period, or dangerous swerving detected while texting using a phone. In one embodiment, the alert, notification, or information transfer medium provides information on the occurrence of the dangerous/banned/illegal/restricted activity, suggests a corrective action (displaying the text "Please slow down," for example), and/or indicates the consequence of the activity (such as an displaying an increased insurance rate or text message notification sent to a third party (such as a guardian) when the operator exceeded a speeding restriction, for example).

In one embodiment, the alert, notification, or information transfer medium is the result of output from one or more algorithms. In one embodiment, the alert, notification, or information transfer medium comprises information that indicates the urgency of incoming communication or information, such as a phone call (for which the cell phone operator may pre-select urgency or priority levels for calls from specific people, groups, or phone numbers, for example), dangerous weather warning from a third party server, or serious traffic problem from a third party server, for example. In one embodiment, the analysis for determining one or more selected from the necessity, the information, and the method of the alert, notification, or information transfer medium is performed by an algorithm executed by a portable device processor, vehicle processor, and/or remote device processor. For example, in one embodiment, an application executed on a cellular phone alerts the vehicle operator to dangerous weather conditions ahead by displaying text information on the dashboard display. In another example, an application executed on a cellular phone: determines the need for an alert indicating that texting while operating the vehicle in the current location is illegal; determines the information to be provided ("Texting while driving is illegal in this county", for example); and determines the method of delivery (such as a text to voice audio notification delivered from the cellular phone to the speakers of the automobile through a Bluetooth™ connection).

In a further embodiment, the cognitive analysis algorithm, the vehicle operation performance algorithm, the risk performance algorithm, or other algorithm performs a risk assessment and one or more algorithms executed on the portable device or vehicle provides information or a warning of the danger of operating one or more functional features or software components or applications (on the portable device or vehicle) while driving under the current (or future expected) operator or environmental conditions. In this embodiment, one or more of the algorithms may utilize information from the vehicle operator profile that can contain current and historical physical, mental, and cognitive information for the vehicle operator and historical data or statistical data from one or more other vehicle operators operating under similar physical, mental, cognitive, or environmental conditions.

Portable Device Function Modification

In one embodiment, portable device functions or portable device software restrictions are controlled at least in part by a third party such as a parent, guardian, insurer, or employer. In this embodiment, the third party may manage the portable device functions or software restrictions directly, indirectly, or using a risk analysis that may utilize a cognitive analysis. The management may be performed directly on the device, remotely through wired or wireless communication, using a web or software application interface, in real-time, automatically, manually, or using instructions, conditions, settings, or algorithms pre-loaded onto the device or transmitted remotely.

In one embodiment, a portable device function modification algorithm executed on a portable device processor modifies (and/or provides information related to) the ability of the portable device operator to use one or more specific portable device functions or portable device features while the portable device operator is operating the vehicle based on a risk assessment, legal restriction, or third party restriction. In one embodiment, the portable device function modification restricts or limits the ability to use; prevents the ability to use; permits use only when criteria are met, prevents or limits the ability to use for a period of time; provides an indicator of one or more primary data sources or data used to determine the risk (such as an indication of the speed, indication of an insurance plan restriction (optional or mandatory), indication of legal restriction, or map indicating the boundary of the legal restriction, for example); suggests one or more actions to reduce or eliminate the restriction; and/or provides an indication of a potential restriction (such as an indicator that a future or current phone call cannot be answered based on the current operator, vehicle, environmental, or third party conditions or restrictions).

In one embodiment, the portable device function modification algorithm is a stand-alone algorithm that may be executed by one or more algorithms or devices. In another embodiment, the portable device function modification algorithm is integrated with one or more other algorithms, such as the risk assessment algorithm, the cognitive analysis algorithm, the monitoring algorithm, the portable device software restriction algorithm, or the vehicle operation algorithm, for example.

In one embodiment, the portable device function modification algorithm is continuously executed when the portable device is turned on. In one embodiment, the portable device function modification algorithm may be running in the background when the portable device is powered on, when the device is in a stand-by mode, and/or when the portable device is being actively operated, for example). In another embodiment, the portable device function modification algorithm begins execution of the restriction when the portable device operator enters or operates a vehicle with the portable device turned on. In a further embodiment, a third party or remote algorithm (such as an algorithm on a remote server or an algorithm on a vehicle processor in communication with the portable device) turns on or instructs the portable device to execute the portable device function modification algorithm. In a further embodiment, the portable device function modification algorithm is executed on a server remote from the vehicle and instructions to modify one or more functions or features of the portable device are sent to the portable device (directly or indirectly).

In one embodiment, the portable device function modification algorithm comprises input in the form of historical information, current information, or predicted future information from one or more selected from the group: the vehicle operation performance algorithm; the cognitive analysis algorithm; the movement isolation algorithm; one or more sensors on the vehicle, portable device, and/or a remote device; one or more user interface components of the vehicle and/or portable device; and/or devices or servers external to the vehicle (such as servers providing data from speeding cameras, traffic violation reports, external map information, weather information, statistical or raw vehicle operation data from the current operator (such as historical vehicle operation performance for the operator), or statistical or raw vehicle operation data from other vehicle operators). In one embodiment, the modification policy or restriction is determined by the operator or owner of the portable device or vehicle, a third party (such as a parent or guardian, a business supervisor, or insurance company) and may be configured on the portable device, controlled by a remote server (such as a third party server for an insurance company), or managed by the operator of the portable device and/or vehicle.

Portable Device Software Restriction

In one embodiment, a portable device software restriction algorithm executed on a portable device processor modifies (and/or provides information related to) the ability of the portable device operator to use one or more specific portable device software components or applications while the portable device operator is operating the vehicle based on a risk assessment, legal restriction, or third party restriction. In one embodiment, the portable device software restriction algorithm restricts or limits the ability to use; prevents the ability to use; permits use only when criteria are met, prevents or limits the ability to use for a period of time; provides an indicator of one or more primary data sources or data used to determine the risk (such as an indication of the speed, indication of an insurance plan restriction (optional or mandatory), indication of legal restriction, or map indicating the boundary of the legal restriction, for example); suggests one or more actions to reduce or eliminate the restriction; and/or provides an indication of a potential restriction (such as an indicator that a future or current instance or operation of the software component or algorithm is restricted based on the current operator, vehicle, environmental, or third party conditions or restrictions).

In one embodiment, the portable device software restriction algorithm is a stand-alone algorithm that may be executed by one or more algorithms or devices. In another embodiment, the portable device function algorithm is integrated with one or more other algorithms, such as the risk assessment algorithm, the cognitive analysis algorithm, the monitoring algorithm, the portable device function modification algorithm, or the vehicle operation algorithm, for example.

In one embodiment, the portable device software restriction algorithm is continuously executed when the portable device is turned on. In one embodiment, the software restriction algorithm may be running in the background when the portable device is powered on, when the device is in a standby mode, and/or when the portable device is being actively operated, for example). In another embodiment, the portable device software restriction algorithm begins execution of the restriction when the portable device operator enters or operates a vehicle with the portable device turned on. In a further embodiment, a third party or remote algorithm (such as an algorithm on a remote server or an algorithm on a vehicle processor in communication with the portable device) turns on or instructs the portable device to execute the portable device software restriction algorithm. In a further embodiment, the portable device software restriction algorithm is executed on a server remote from the vehicle and instructions to restrict the software component or application are sent to the portable device (directly or indirectly).

In one embodiment, the portable device software restriction algorithm comprises input in the form of historical information, current information, or predicted future information from one or more selected from the group: the vehicle operation performance algorithm; the cognitive analysis algorithm; the movement isolation algorithm; one or more sensors on the vehicle, portable device, and/or a remote device; one or more user interface components of the vehicle and/or portable device; and/or devices or servers external to the vehicle (such as servers providing data from speeding cameras, traffic violation reports, external map information, weather information, statistical or raw vehicle operation data from the current operator (such as historical vehicle operation performance for the operator), or statistical or raw vehicle operation data from other vehicle operators). In one embodiment, the restriction is determined by the operator or owner of the portable device or vehicle, a third party (such as a parent or guardian, a business supervisor, or insurance company) and may be configured on the portable device, controlled by a remote server (such as a third party server for an insurance company), or managed by the operator of the portable device and/or vehicle.

Algorithms and Software

In one embodiment, two or more of the aforementioned algorithms are executed by a single algorithm which may be one of the aforementioned algorithms. For example, in one embodiment, the cognitive load algorithm, cognitive capacity algorithm, cognitive analysis algorithm may be integrated into a cognition algorithm which along with a vehicle operation algorithm is part of an insurance company software application installed on a cellular phone non-transitory computer-readable storage medium and executed by the cellular phone processor. Two or more algorithms may transmit, receive, and/or share instructions, input, or output from one or more other algorithms. In one embodiment, a software application installed on a portable device comprises one or more of the aforementioned algorithms integrated into the software application or in communication with the application software.

In one embodiment, one or more of the algorithm's instructions; the input information received by one or more algorithms, and/or the information output transmitted from one or more algorithms is updated autonomously, updated on demand, manually updated, updated by a remote server (such as a third party insurance company server), periodically updated, configured by the portable device operator, a second party (such as a cellular phone data service provider or the operating system software provider or update service, for example), or a third party (such as an insurance company provider).

In one embodiment, one or more of the aforementioned algorithms is continuously executed when the portable device is turned on. In one embodiment, one or more of the aforementioned algorithms may be running in the background when the portable device is powered on, when the device is in a stand-by mode, and/or when the portable device is being actively operated, for example). In another embodiment, one or more of the aforementioned algorithms begins execution of instructions when the portable device operator enters or operates a vehicle with the portable device turned on. In a further embodiment, a third party or remote algorithm (such as an algorithm on a remote server or an algorithm on a vehicle processor in communication with the portable device) turns on or instructs the portable device to execute one or more of the aforementioned algorithms. In a further embodiment, one or more of the aforementioned algorithms is executed on a server remote from the vehicle and instructions to execute one or more of the aforementioned algorithms are sent to the portable device (directly or indirectly).

In one embodiment, one or more of the aforementioned algorithms receives updated input information continuously, in real-time, on-demand, and/or when transmitted from a remote server. In another embodiment, one or more of the aforementioned algorithms measures or seeks updated information (such as an application software executing a cognitive load algorithm for vehicle operation substantially continuously to use updated information from one or more sensors (speed sensor, for example), user interface components (touchscreen use indicator), or third party servers, for example.

In one embodiment, A method of generating risk related information for insurance underwriting comprises: obtaining first information correlating to movement of a vehicle; obtaining second information different from the first information correlating to movement of a portable device relative to the vehicle during use of the portable device by an operator of the vehicle while operating the vehicle; correlating the first information with the second information to evaluate a vehicle operation performance by the operator of the vehicle; and generating risk related information associated with the operator of the vehicle based on the vehicle operation performance. In another embodiment, the first information and the second information are obtained from output information from one or more sensors within the portable device and the one or more sensors may comprise at least one accelerometer. In a further embodiment, the method further comprises executing a movement isolation algorithm on the output information from the one or more sensors using a processor to generate the first information and the second information. In one embodiment, the risk related information is a distracted driving score. In another embodiment, a method of generating risk related information for insurance underwriting comprises obtaining first information correlating to movement of a vehicle; obtaining second information different from the first information correlating to movement of a portable device relative to the vehicle during use of the portable device by a vehicle operator while operating the vehicle; obtaining third information correlating to the use of the portable device by the vehicle operator while operating the vehicle; correlating the first information, the second information, and the third information to evaluate a vehicle operation performance by the operator of the vehicle; and generating risk related information associated with the vehicle operator based on the vehicle operation performance. In one embodiment, the portable device comprises at least one processor and the use of the portable device comprises using one or more software applications or algorithms executed by the at least one processor. In another embodiment, the use of the portable device comprises using one or more functional features of the portable device. In a further embodiment, the vehicle operation performance provides information for insurance risk scoring, insurance pricing, insurance fraud identification, insurance claim analysis, accident fault determination, or generation of a risk assessment of the vehicle operator for insurance underwriting.

In one embodiment, a system for generating risk related information for insurance underwriting comprises: a portable device comprising at least one accelerometer and a non-transitory computer-readable storage medium comprising accelerometer information received from the at least one accelerometer; a first processor executing a movement isolation algorithm on the accelerometer information, the movement isolation algorithm extracting first information correlating to movement of a vehicle and second information correlating to movement of the portable device relative to the vehicle; a second processor executing a correlation algorithm, the correlation algorithm correlates the first information with the second information and generates vehicle operation performance information for a vehicle operator during use of the portable device while operating the vehicle; and a third processor executing a risk assessment algorithm on the vehicle operation performance information to generate a risk assessment of the vehicle operator for insurance underwriting. In one embodiment, a server remote from the portable device comprises the first processor. In a further embodiment, at least two of the first processor, the second processor, and the third processor are the same processor. In one embodiment, the portable device comprises at least two selected from the group: the first processor, the second processor, and the third processor. In another embodiment, the at least one accelerometer is calibrated for acceleration reading and orientation at a rate providing accuracy sufficient for isolating the first information and the second information during use of the portable device while operating the vehicle. In one embodiment, at least one accelerometer is calibrated for acceleration reading and orientation at a rate during the operation of the vehicle greater than or equal to one selected from the group: once per hour, once per minute, once per second, twice per second, ten times per second, and 100 times per second. In a further embodiment, the at least one accelerometer is calibrated after the portable device changes orientation during operation of the vehicle. In another embodiment, the second information comprises movement information of the portable device during two operational movement events of the vehicle, and the at least one accelerometer is calibrated for acceleration reading and orientation at a time between the two operational movement events. In a further embodiment, the portable device further comprises at least one gyroscope providing gyroscopic information and the at least one accelerometer may be calibrated based on the gyroscopic information after an orientation of the portable device changes during operation of the vehicle.

FIG. 1 is a data flow diagram view of one embodiment of a vehicle operation performance analysis system for a vehicle operator 127 operating a portable device 103 while operating a vehicle 101. The portable device 103 is shown exterior to the vehicle 101 in FIG. 1 for clarity; however, the portable device is typically used by the operator 127 within the vehicle 101. In this embodiment, vehicle sensor information 123 from a sensor 100 of a vehicle 101 can provide vehicle movement information 105 as input to the vehicle operation performance algorithm 106. A sensor 102 of a portable device 103 (such as a smartphone) can provide portable device sensor information 125 as input directly to the vehicle operation performance algorithm 106. The portable device 103 may also send and/or receive 124 information from the vehicle 101 (such as through a wireless Bluetooth™ connection to the OBD system, for example). The portable device sensor information 125 can include movement information 104 (such as spatial and/or temporal movement information from one or more accelerometers, gyroscopes, compasses, gyroscopes, etc.) that is input into a movement isolation algorithm 119. The movement isolation algorithm 119 processes the movement information 104 from the portable device 103 (and optionally vehicle movement information 105 from the vehicle 101) to generate isolated portable device movement information 120 for specific times or events ($t_1, t_2, t_3, \ldots, t_n$) that is transferred as input to the vehicle operation performance algorithm 106. The vehicle operation performance algorithm 106 can also receive portable device sensor information 125, portable device feature use information 107, and/or portable device software use information 121 from the portable device 103 as input. The vehicle operation performance algorithm 106 processes the input to generate vehicle operation performance information 108. The vehicle operation performance information 108 can include one or more information types selected from the group: risk related information 109; information for insurance underwriting 110; loss control information 111; insurance claim analysis information 112; accident fault information 113; increased risk or danger information 114; prohibited, illegal, restricted or allowed portable device features or applications information 115; and historical vehicle operation performance information 126 of any of the aforementioned types of vehicle operation performance information 108.

In one embodiment, the vehicle operation performance information 108 is used to perform one or more of the functions selected from the group; modify the ability of the vehicle operator 127 to use portable device software applications 116; modify the ability of the vehicle operator 127 to use portable device functional features 117; alert or provide feedback 118 to the vehicle operator 127; and provide information to a second and/or third party 122.

Figure 2:
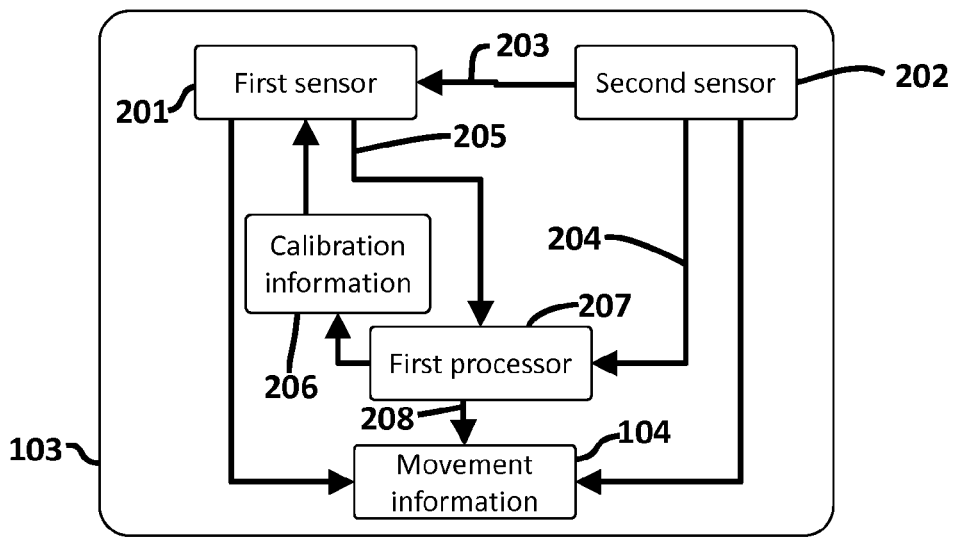
FIG. 2 is a data flow diagram view of one embodiment of a method of calibrating a first sensor to generate movement information in a portable device.

FIG. 2 is a data flow diagram view of one embodiment of a method of calibrating a first sensor 201 (such as an accelerometer) to generate movement information 104 in a portable device 103. In this embodiment, the first sensor 201 can provide a first measurement reading 205 to a first processor 207 on the portable device 103. The first processor 207 can also receive input 204 from a second sensor 202 (such as a gyroscope) to calibrate the reading 205 from the first sensor 201. The first processor 207 can send calibration information 206 to the first sensor 201 (in embodiments where the calibration adjustment is performed by the first sensor 201), or the first processor 207 can perform the calibration or adjustment and output 208 the movement information 104. The second sensor 202 may send a measurement reading 203 to the first sensor to provide for the calibration of the first sensor 201. The first sensor 201 may directly output movement information 104 or movement information 208 may be generated by the first processor 207. The movement information 104 may also comprise information from the second sensor 202 (or external sensors or devices, not shown).

In one embodiment, a vehicle 101, portable device 103, or device external to the vehicle and portable device may comprise one or more of the first sensor 201, second sensor 202, and first processor 207. In one embodiment, a single device, component, computer chip, or device package comprises one or more of the first sensor 201, second sensor 202, and first processor 207.

Figure 3:
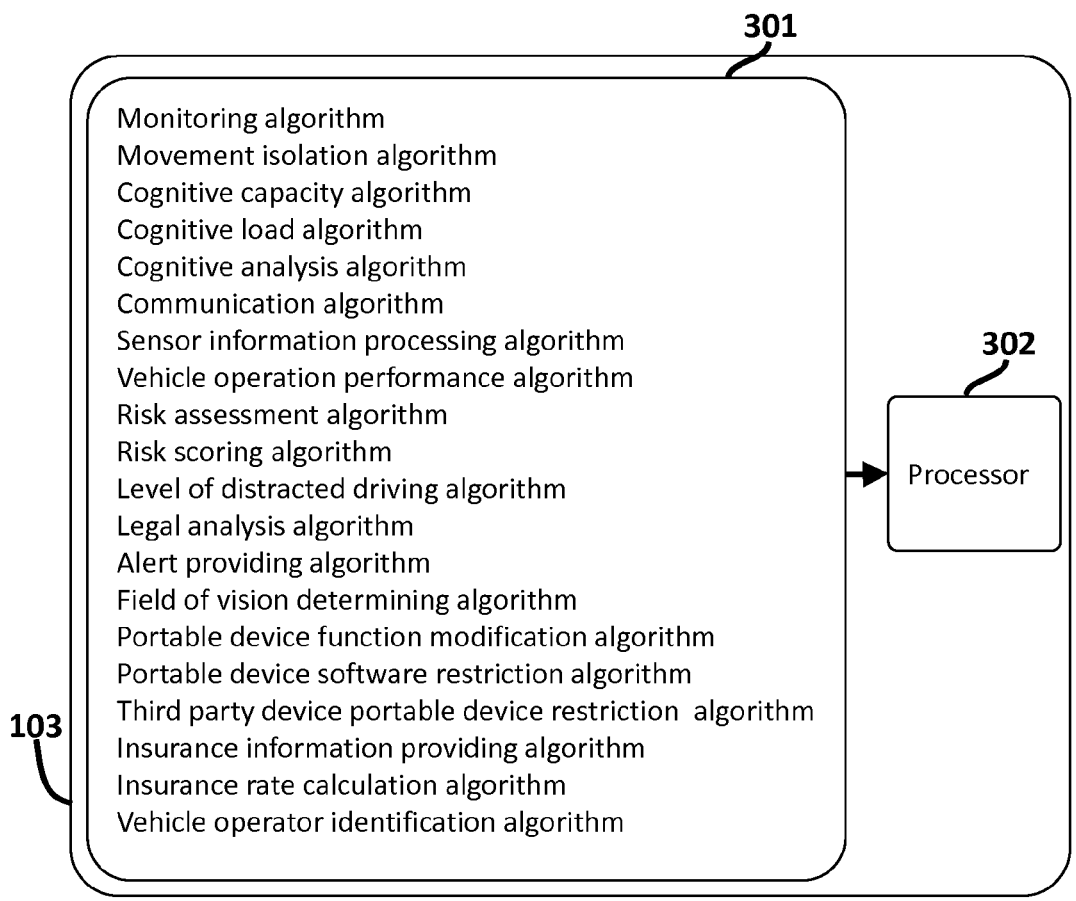
FIG. 3 is a diagram of one embodiment of a portable device comprising a processor that can load and execute one or more algorithms stored on a non-transitory computer-readable storage medium.

FIG. 3 is a diagram of one embodiment of a portable device 103 comprising a processor 302 that can load and execute one or more algorithms stored on a non-transitory computer-readable storage medium 301. In this embodiment, the processor 302 can load and execute one or more algorithms from the non-transitory computer-readable storage medium 301 selected from the group: monitoring algorithm, movement isolation algorithm, cognitive capacity algorithm, cognitive load algorithm, cognitive analysis algorithm, communication algorithm, sensor information processing algorithm, vehicle operation performance algorithm, risk assessment algorithm, risk scoring algorithm, level of distracted driving algorithm, legal analysis algorithm, alert providing algorithm, field of vision determining algorithm, portable device function modification algorithm, portable device software restriction algorithm, third party device portable device restriction algorithm, insurance information providing algorithm, insurance rate calculation algorithm, and vehicle operator identification algorithm.

Figure 4:
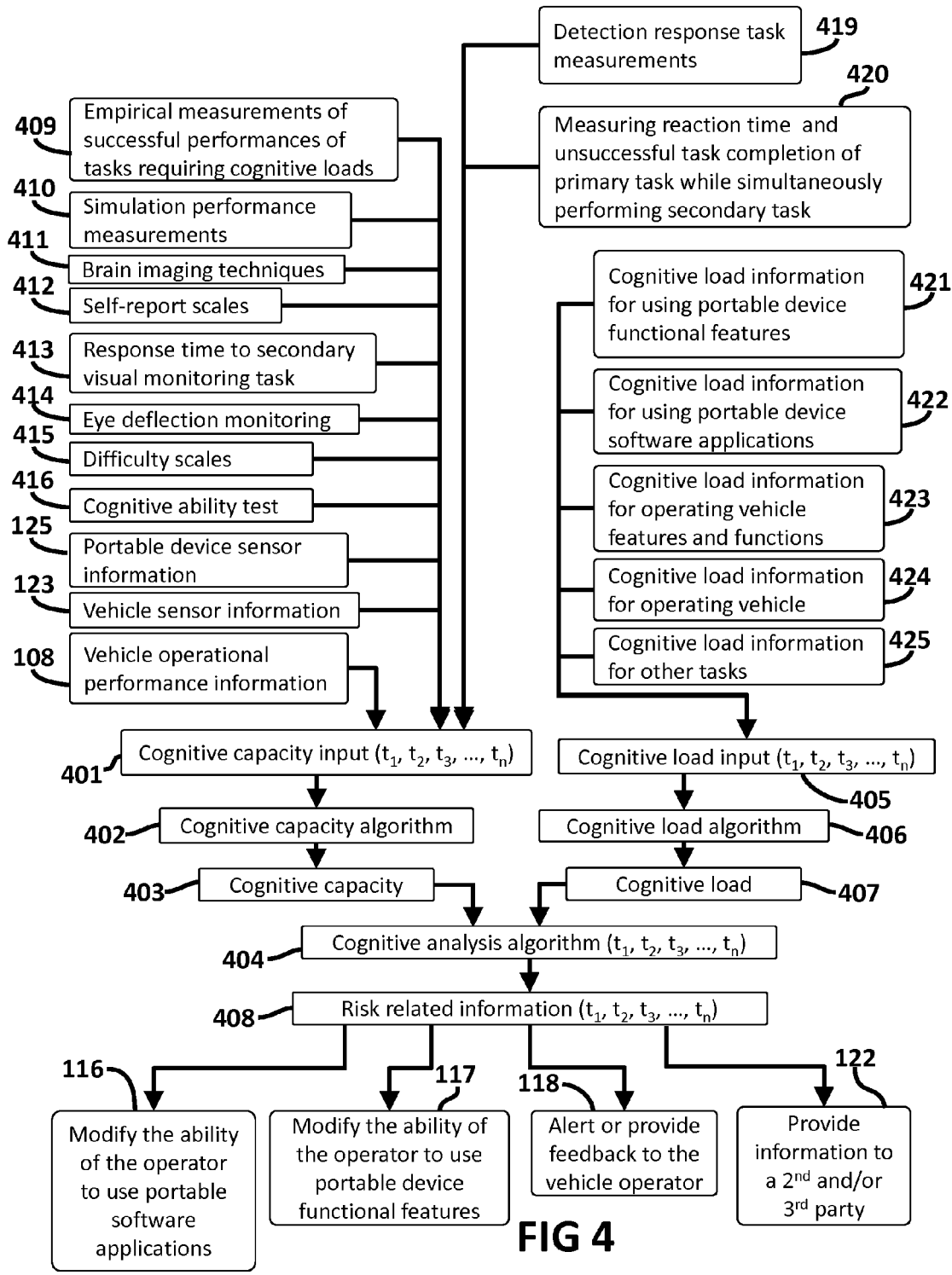
FIG. 4 is a flow diagram of one embodiment of a method of generating risk related information for an operator of a vehicle using a cognitive analysis algorithm.

FIG. 4 is a flow diagram of one embodiment of a method of generating risk related information 408 for an operator of a vehicle using a cognitive analysis algorithm 404. In this embodiment, the cognitive analysis algorithm 404 evaluates the cognitive capacity 403, and the cognitive load 407 of the vehicle operator generated using a cognitive capacity algorithm 402 and cognitive load algorithm 406, respectively. The cognitive capacity algorithm 402 can receive cognitive capacity input 401 at one or more times or events (such as $t_1$, $t_2$, $t_3, \ldots, t_n$ for example). The cognitive capacity input 401 can include input from one or more selected from the group: empirical measurements of successful performances of tasks requiring cognitive loads 409; simulation performance measurements 410; brain imaging techniques 411; self-report scales 412; response time to secondary visual monitoring task 413; eye deflection monitoring 414; difficulty scales 415; cognitive ability test 416; portable device sensor information 125; vehicle sensor information 123; vehicle operational performance information (including historical information) 108; detection response task measurements 419; and measuring reaction time and unsuccessful task completion of primary task while simultaneously performing secondary task 420.

The cognitive load algorithm 406 can receive cognitive load input 405 at one or more times or events (such as $t_1$, $t_2$, $t_3, \ldots, t_n$ for example). The cognitive load input 405 can include input from one or more selected from the group: cognitive load information for using portable device functional features 421; cognitive load information for using portable device software applications 422; cognitive load information for operating vehicle features and functions 423; cognitive load information for operating vehicle 424; and cognitive load information for other tasks 425. As a result of the analysis performed by the cognitive analysis algorithm 404, the portable device or vehicle may respond by performing one or more of the functions selected from the group; modify the ability of the vehicle operator to use portable device software applications 116; modify the ability of the vehicle operator to use portable device functional features 117; alert or provide feedback to the vehicle operator 118; and provide information to a 2nd and/or 3rd party 122.

Figure 5:
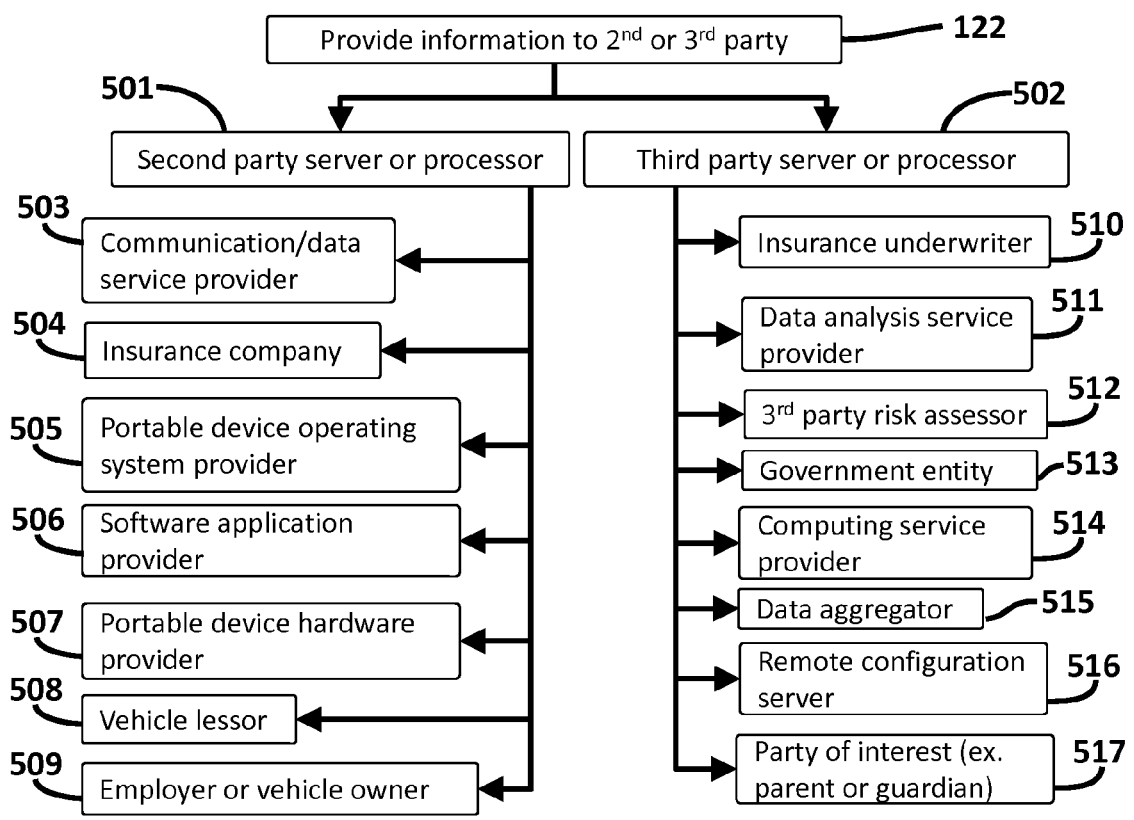
FIG. 5 is a data flow diagram of one embodiment of a system for transferring information to a second party or third party.
Figure 6:
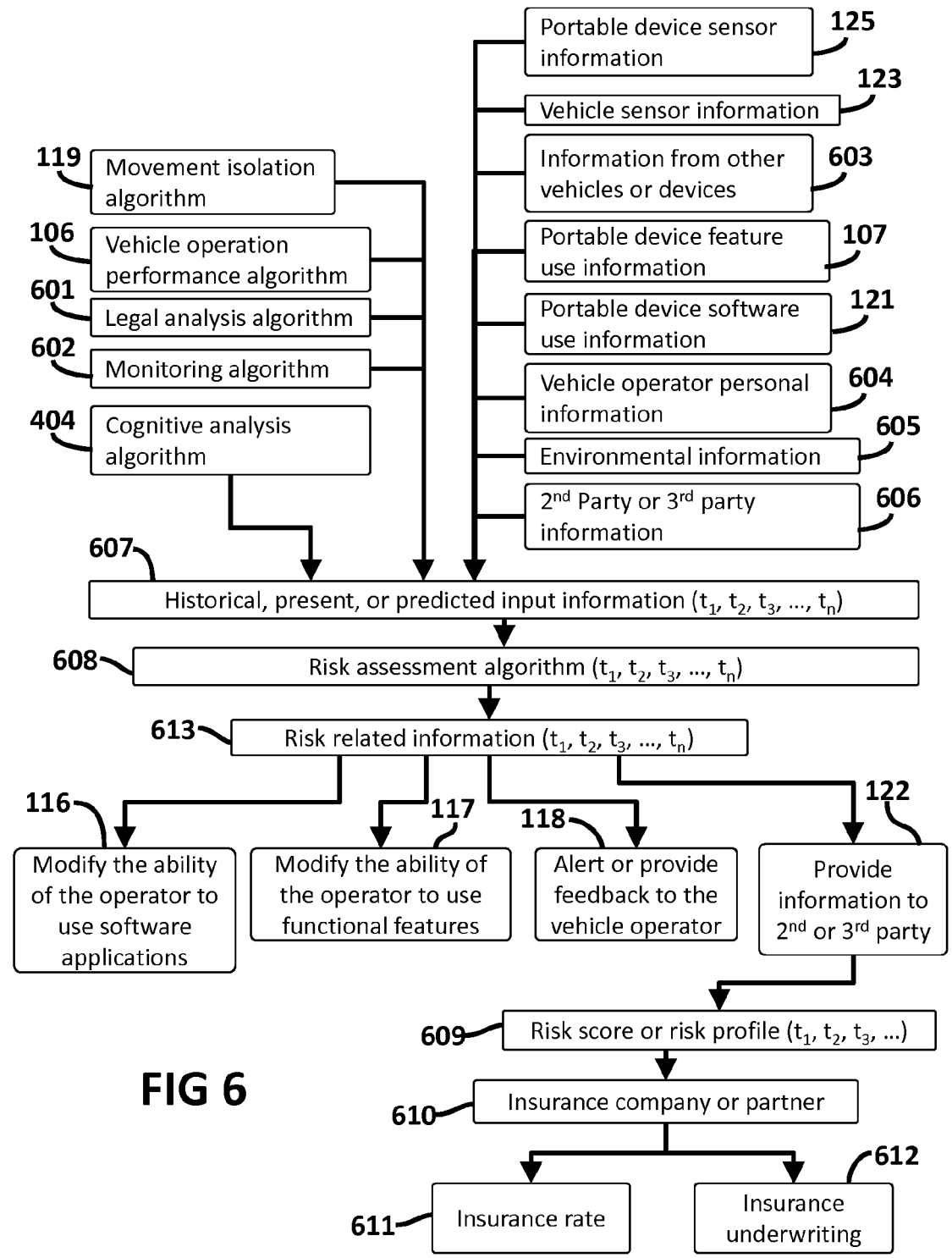
FIG. 6 is a flow diagram of one embodiment of a method of generating risk related information for an operator of a vehicle using a risk assessment algorithm.

FIG. 5 is a data flow diagram of one embodiment of a system for transferring information to a second party or third party 122 (such as vehicle operation performance information 108 (see FIG. 1) or risk related information 408 and 613 (see FIGS. 4 and 6, respectively). In this embodiment, the information can be transferred to a second party server or processor 501. The second party server or processor 501 may be in communication one or more second parties selected from the group: communication/data service provider 503; insurance company 504; portable device operating system provider 505; software application provider 506; portable device hardware provider 507; vehicle lessor 508; and employer or vehicle owner 509. In addition or alternatively, the information provided to the second or third party 122 can be transferred to a third party server or processor 501. The third party server or processor 502 may be in communication one or more second parties selected from the group: insurance underwriter 510; data analysis service provider 511; 3rd party risk assessor 512; government entity 513 (such as the local police department); computing service provider 514 (such as a cloud computing service provider); data aggregator 515; remote configuration server 516; and party of interest 517 (such as a parent or guardian of the vehicle operator).

FIG. 6 is a flow diagram of one embodiment of a method of generating risk related information 613 for an operator of a vehicle using a risk assessment algorithm 608. In this embodiment, the risk assessment algorithm 608 evaluates the historical, present, and/or predicted input information 607 for one or more times or events (such as $t_1$, $t_2$, $t_3, \ldots, t_n$, for example). The historical, present, and/or predicted input information 607 for the risk assessment algorithm 608 can include the output from one or more algorithms selected from the group: movement isolation algorithm 119; vehicle operation performance algorithm 106; legal analysis algorithm 601; monitoring algorithm 602; and cognitive analysis algorithm 404. Additionally, the historical, present, and/or predicted input information 607 for the risk assessment algorithm 608 can include information selected from one or more of the group: portable device sensor information 125; vehicle sensor information 123; information from other vehicles or devices 603; portable device feature use information 107; portable device software use information 121; vehicle operator personal information 604; environmental information 605; and second party and/or third party information 606.

As a result of the analysis performed by the risk assessment algorithm 608, the portable device or vehicle may respond by performing one or more of the functions selected from the group; modify the ability of the vehicle operator to use portable device software applications 116; modify the ability of the vehicle operator to use portable device functional features 117; alert or provide feedback to the vehicle operator 118; and provide information to a second and/or third party 122. In one embodiment, the risk related information 613 is provided to a second party 122 in the form of a risk score or risk profile (such as a risk profile with multiple time-indexed risk scores or with multiple time-indexed risk related information sets, for example). In this embodiment, the risk related information 613 (in the form of a risk score or risk profile 609) is provided to a second party 122 who is an insurance company or insurance company partner 610 and the risk related information 613 is use to help generate an insurance rate 611 or help in the process of insurance underwriting 612.

Equivalents

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. This application is intended to cover any adaptations or variations of the specific embodiments discussed herein. Therefore, it is intended that this disclosure be limited only by the claims and the equivalents thereof. Heading are for convenience only.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

What is claimed is:

1. A method of generating risk related information for insurance underwriting or risk assessment using a portable device comprising one or more processors, the method comprising:
 a. storing on a first non-transitory computer-readable media first information correlating to movement of a vehicle;
 b. executing a movement isolation algorithm on a first processor on at least output information from one or more sensors of the portable device and generating second information, the one or more sensors comprising an accelerometer or an accelerometer and a gyroscope, the second information different from the first information and including information correlating to changes in orientation of the portable device relative to orientation of the vehicle during use of or interaction with the portable device by an operator of the vehicle while operating the vehicle;
 c. executing on a second processor a vehicle operation performance algorithm on at least the first information and the second information, the vehicle operation performance algorithm generating vehicle operation performance information associated with the operator of the vehicle; and
 d. executing on a third processor a risk assessment algorithm on at least the vehicle operation performance information, the risk assessment algorithm generating risk related information associated with the operator of the vehicle.

2. The method of claim 1 wherein the output information from the one or more sensors of the portable device is stored on a non-transitory computer-readable medium of the portable device, and the portable device comprises the first processor.

3. The method of claim 1 wherein the second information further includes information correlating to changes in spatial motion or position of the portable device relative to spatial motion or position of the vehicle.

4. The method of claim 1 further comprising calibrating the accelerometer for acceleration reading and orientation at a rate during operation of the vehicle greater than or equal to one selected from the group: once per hour, once per minute, once per second, twice per second, ten times per second, and 100 times per second.

5. The method of claim 1 wherein the risk related information is a distracted driving score.

6. A method of generating risk related information for insurance underwriting or risk assessment using a portable device comprising one or more processors, the method comprising:
 a. storing on a first non-transitory computer-readable media first information correlating to movement of a vehicle;
 b. executing a movement isolation algorithm on a first processor on at least output information from one or more sensors of the portable device and generating second information, the one or more sensors comprising an accelerometer or an accelerometer and a gyroscope, the second information different from the first information and including information correlating to changes in orientation of the portable device relative to orientation of the vehicle during use of or interaction with the portable device by a vehicle operator while operating the vehicle;
 c. storing on a second non-transitory computer-readable media third information correlating to the use of or interaction with the portable device by the vehicle operator while operating the vehicle;
 d. executing on a second processor a vehicle operation performance algorithm on at least the first information, the second information, and the third information to generate vehicle operation performance information associated with the vehicle operator; and
 e. executing on a third processor a risk assessment algorithm on at least the vehicle operation performance information, the risk assessment algorithm generating risk related information associated with the vehicle operator.

7. The method of claim 6 wherein the portable device comprises at least one of the first processor, second processor, and third processor and the use of or interaction with the portable device comprises using one or more software applications or algorithms executed by the at least one of the first processor, second processor, and third processor.

8. The method of claim 6 wherein the use of the portable device comprises using one or more functional features of the portable device.

9. The method of claim 6 wherein the vehicle operation performance information includes information for insurance risk scoring, distracted driving scoring, insurance pricing, insurance fraud identification, insurance claim analysis, accident fault determination, or generation of a risk assessment of the vehicle operator for insurance underwriting or risk management.

10. A system for generating risk related information for insurance underwriting or risk assessment, the system comprising:
   a. a portable device comprising at least one accelerometer and a non-transitory computer-readable storage medium comprising accelerometer information received from the at least one accelerometer;
   b. a first processor executing a movement isolation algorithm on at least the accelerometer information, the movement isolation algorithm extracting first information correlating to movement of a vehicle and second information correlating to changes in orientation of the portable device relative to orientation of the vehicle;
   c. a second processor executing a vehicle operation performance algorithm on at least the first information and the second information and generating vehicle operation performance information for a vehicle operator using or interacting with the portable device while operating the vehicle; and
   d. a third processor executing a risk assessment algorithm on at least the vehicle operation performance information to generate a risk assessment of the vehicle operator for insurance underwriting or risk management.

11. The system of claim 10 wherein a server remote from the portable device comprises the first processor.

12. The system of claim 10 wherein at least two of the first processor, the second processor, and the third processor are the same processor.

13. The system of claim 10 wherein the portable device comprises at least two selected from the group: the first processor, the second processor, and the third processor.

14. The system of claim 10 wherein the at least one accelerometer is calibrated for acceleration reading and orientation at a rate providing accuracy sufficient for isolating the first information and the second information during use of the portable device while operating the vehicle.

15. The system of claim 10 wherein the at least one accelerometer is calibrated for acceleration reading and orientation at a rate during the operation of the vehicle greater than or equal to one selected from the group: once per hour, once per minute, once per second, twice per second, ten times per second, and 100 times per second.

16. The system of claim 10 wherein the at least one accelerometer is calibrated after the portable device changes orientation during operation of the vehicle.

17. The system of claim 10 wherein the second information comprises movement information of the portable device during two operational movement events of the vehicle, and the at least one accelerometer is calibrated for acceleration reading and orientation at a time between the two operational movement events.

18. The system of claim 10 wherein the portable device further comprises at least one gyroscope providing gyroscopic information.

19. The system of claim 18 wherein the at least one accelerometer is calibrated based on the gyroscopic information after an orientation of the portable device changes during operation of the vehicle.

20. The system of claim 10 wherein the vehicle operation performance information includes information for insurance risk scoring, distracted driving scoring, insurance pricing, insurance fraud identification, insurance claim analysis, accident fault determination, or generation of a risk assessment of the vehicle operator for insurance underwriting or risk management.

21. The system of claim 10 wherein the risk assessment includes a distracted driving score.

22. The system of claim 10 wherein the third processor executes the risk assessment algorithm on at least the vehicle operation performance information and information related to functional use or operation of the portable device to generate the risk assessment of the vehicle operator for insurance underwriting or risk management.

23. The system of claim 10 wherein the third processor executes the risk assessment algorithm on at least the vehicle operation performance information and statistical risk related information or vehicle operation performance information corresponding to one or more other vehicle operators to generate the risk assessment of the vehicle operator for insurance underwriting or risk management.

24. A system for generating risk related information for insurance underwriting using a portable device, the system comprising:
   a. a portable device comprising at least one accelerometer and a non-transitory computer-readable storage medium comprising accelerometer information received from the at least one accelerometer;
   b. a first processor executing a movement isolation algorithm on at least the accelerometer information, the movement isolation algorithm extracting first information correlating to movement of a vehicle and second information correlating to changes in orientation of the portable device relative to orientation of the vehicle;
   c. a second processor executing a risk assessment algorithm on at least vehicle operation performance information including the first information and the second information for a vehicle operator using or interacting with the portable device while operating the vehicle to generate a risk assessment of the vehicle operator for insurance underwriting or risk management.

\* \* \* \* \*